United States Patent
Nam et al.

(10) Patent No.: US 10,524,204 B2
(45) Date of Patent: Dec. 31, 2019

(54) APPARATUS FOR COMMUNICATION USING UNLICENSED BAND AND METHOD THEREOF

(71) Applicant: Samsung Electronics Co., Ltd., Suwon-si, Gyeonggi-do (KR)

(72) Inventors: Chang Won Nam, Seoul (KR); Dae Ho Kang, Suwon-si (KR); Sung Jin Park, Seoul (KR); Hyung Yeol Lee, Seoul (KR); Won Joon Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 15/850,652

(22) Filed: Dec. 21, 2017

(65) Prior Publication Data

US 2018/0192370 A1    Jul. 5, 2018

(30) Foreign Application Priority Data

Jan. 5, 2017    (KR) .................. 10-2017-0002043

(51) Int. Cl.
*H04W 52/02*    (2009.01)
*H04W 72/04*    (2009.01)
(Continued)

(52) U.S. Cl.
CPC ..... *H04W 52/0216* (2013.01); *H04L 27/0006* (2013.01); *H04W 52/0245* (2013.01);
(Continued)

(58) Field of Classification Search
None
See application file for complete search history.

(56) References Cited

U.S. PATENT DOCUMENTS 8,326,348 B2    12/2012    Choi et al.
2008/0171568 A1    7/2008    Choi et al.
(Continued)

FOREIGN PATENT DOCUMENTS

EP    1 944 984 A1    7/2008
EP    3308582 B1 *    2/2019    ........ H04W 74/0808
(Continued)

OTHER PUBLICATIONS

Qualcomm Incorporated, "DRX and PHY layer aspects for LAA", 3GPP DRAFT, R1-157047 DRX and PHY Layer Aspects for LAA, 3rd Generation Partnership Project (3GPP), Mobile Competence Centre, 650, Route Des Lucioles, F-06921 Sophia-Antipolis Cedex, France, vol. RAN WG1, No. Anaheim, USA, Nov. 15, 2015 (Nov. 15, 2015), XP051003350.
(Continued)

*Primary Examiner* — Chi H Pham
*Assistant Examiner* — Vladislav Y Agureyev
(74) *Attorney, Agent, or Firm* — Jefferson IP Law, LLP

(57) ABSTRACT

An electronic apparatus is provided. The electronic apparatus includes a radio frequency (RF) module receiving a signal from a base station (BS) of a first network through a downlink subframe including a plurality of symbols in an unlicensed band and at least one processor operating in a first mode or in a second mode power consumed in the second mode is lower than power consumed in the first mode.

15 Claims, 22 Drawing Sheets

(51) Int. Cl.
*H04L 27/00* (2006.01)
*H04W 84/12* (2009.01)
*H04W 88/06* (2009.01)
*H04L 5/00* (2006.01)

(52) U.S. Cl.
CPC ......... *H04W 72/0446* (2013.01); *H04L 5/005* (2013.01); *H04W 52/0229* (2013.01); *H04W 84/12* (2013.01); *H04W 88/06* (2013.01); *Y02D 70/00* (2018.01); *Y02D 70/10* (2018.01); *Y02D 70/12* (2018.01); *Y02D 70/122* (2018.01); *Y02D 70/126* (2018.01); *Y02D 70/1242* (2018.01); *Y02D 70/1262* (2018.01); *Y02D 70/1264* (2018.01); *Y02D 70/14* (2018.01); *Y02D 70/142* (2018.01); *Y02D 70/20* (2018.01); *Y02D 70/26* (2018.01)

(56) References Cited

U.S. PATENT DOCUMENTS

| | | | | |
|---|---|---|---|---|
| 2013/0095832 | A1* | 4/2013 | Cheng | H04W 36/0088 455/436 |
| 2013/0201857 | A1* | 8/2013 | Bhargava | H04K 3/222 370/252 |
| 2015/0195849 | A1 | 7/2015 | Bashar et al. | |
| 2015/0208253 | A1* | 7/2015 | Kim | H04W 24/02 370/252 |
| 2017/0071003 | A1 | 3/2017 | Lindoff et al. | |
| 2018/0091242 | A1* | 3/2018 | Li | H04B 17/382 |
| 2018/0132260 | A1* | 5/2018 | Harada | H04W 72/1268 |
| 2018/0167949 | A1* | 6/2018 | Del Carpio Vega | H04W 74/0808 |
| 2018/0241525 | A1* | 8/2018 | Ouchi | H04W 16/14 |
| 2019/0075596 | A1* | 3/2019 | Ye | H04L 5/0053 |

FOREIGN PATENT DOCUMENTS

| | | | | |
|---|---|---|---|---|
| EP | 3337257 A4 * | 3/2019 | ........ | H04W 72/1268 |
| WO | WO-2016095397 A1 * | 6/2016 | .......... | H04B 17/382 |
| WO | 2016-128041 A1 | 8/2016 | | |

OTHER PUBLICATIONS

Qualcomm Incorporated, "DRX operation and PHY layer aspects in LAA", 3GPP Draft, R1-152787-DRX Operation and PHY Layer Aspects in LAA, 3rd Generation Partnership Project(3GPP), Mobile Competence Centre, 650, Route Des Lucioles, F-06921 Sophia-Antipolis Cedex, FRA, vol. RAN WG1, No. Fukuoka, Japan, May 24, 2015 (May 24, 2015), XP050973258.

European Search Report dated May 14, 2018, issued in European Patent Application No. 18150157.8.

* cited by examiner

APPARATUS FOR COMMUNICATION USING UNLICENSED BAND AND METHOD THEREOF

CROSS-REFERENCE TO RELATED APPLICATION(S)

This application claims the benefit under 35 U.S.C. § 119(a) of a Korean patent application filed on Jan. 5, 2017 in the Korean Intellectual Property Office and assigned Serial number 10-2017-0002043, the entire disclosure of which is hereby incorporated by reference.

TECHNICAL FIELD

The present disclosure relates to a technology that receives a signal by using an unlicensed band.

BACKGROUND

In an long term evolution-advanced (LTE-A) technology, a carrier aggregation (CA) technology has been introduced to broaden the bandwidth of a mobile communication system. To overcome the bandwidth limitation due to the increase of mobile data traffic, the 3rd generation partnership project (3GPP) standard has recently adopted licensed-assisted access (LAA), which sets a part of carriers according to the CA to a frequency band for wireless fidelity (Wi-Fi). Before the discussion on the LAA, the discussion on long term evolution-unlicensed (LTE-U) is underway. The LTE-U is a non-standard technology that uses the frequency band for Wi-Fi as the long term evolution (LTE) frequency band.

SUMMARY

Base stations (BSs) supporting licensed-assisted access (LAA) or long term evolution-unlicensed (LTE-U) may occupy the channel for transmission or may not occupy the channel for transmission, depending on the state of the channel. An electronic apparatus operating in an unlicensed band may detect reference signals of the BSs to grasp a channel occupation state. The electronic apparatus grasping the channel occupation state may switch a communication mode, such as a wakeup mode or a sleep mode, at the boundary between symbols, slots, or subframes. Accordingly, the electronic apparatus maintains a transmission/reception state or a communication mode during a specific time regardless of whether a BS really occupies a channel.

Meanwhile, the case where the channel is already occupied by a heterogeneous network using unlicensed band such as a wireless local area network (WLAN) may occur. In this case, even though it is expected that a signal is not received from an LTE-U BS or an LAA BS, the electronic apparatus maintains an operation associated with the BS.

According to a conventional technology, even in the case where it is expected that there is no transmission from the LTE-U BS or the LAA BS, the electronic apparatus may waste power unnecessarily to monitor or receive a signal.

Aspects of the present disclosure are to address at least the above-mentioned problems and/or disadvantages and to provide at least the advantages described below. Accordingly, an aspect of the present disclosure is to provide an apparatus using an unlicensed band and a communication method thereof.

In accordance with an aspect of the present disclosure, an electronic apparatus is provided. The electronic apparatus includes a radio frequency (RF) module receiving a signal from a BS of a first network through a downlink subframe including a plurality of symbols in an unlicensed band and at least one processor operating in a first mode or in a second mode. The amount of power consumed in the second mode is lower than the amount of power consumed in the first mode.

In accordance with another aspect of the present disclosure, a method is provided. The method includes measuring, by the electronic apparatus in a wakeup mode, received signal strength in a first duration corresponding to a part of a specific symbol and, in response to the measured received signal strength satisfying a specified level, switching to a sleep mode during a second duration including the remaining part of the specific symbol.

In accordance with another aspect of the present disclosure, an electronic apparatus is provided. The electronic apparatus includes an RF module communicating with a first BS performing first network communication, in an unlicensed band and at least one processor electrically connected to the RF module. The at least one processor is configured, in response to detecting a preamble, which is received from a second BS performing second network communication through a specific frame, during a first duration, to obtain information about a transmission time received through the specific frame, to determine a second duration for operating in a sleep mode, based on the information about the transmission time, and to communicate with the first network in a sleep mode during the second duration.

According to various embodiments disclosed in this specification, an electronic apparatus may effectively save signal reception power.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
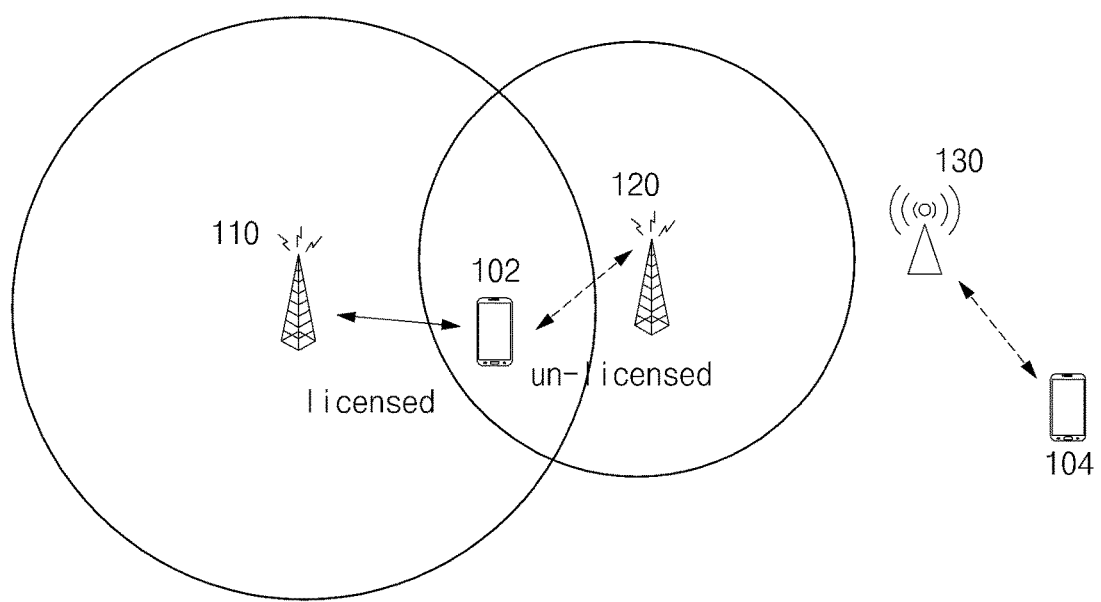
FIG. 1 illustrates a network environment capable of being applied according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude various embodiments of this disclosure.

An electronic apparatus according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

Hereinafter, electronic apparatus according to various embodiments will be described with reference to the accompanying drawings. In this disclosure, the term "user" may refer to a person who uses an electronic apparatus or may refer to a device (e.g., an artificial intelligence electronic apparatus) that uses the electronic apparatus.

FIG. 1 illustrates a network environment applied to the present disclosure according to an embodiment of the present disclosure.

Referring to FIG. 1, an electronic apparatus 102 may transmit or receive a signal to or from a base station (BS) 110 in a licensed band. The electronic apparatus 102 may transmit or receive a signal to or from a BS 120 in an unlicensed band. In an embodiment, the electronic apparatus 102 may only receive a signal from the BS 120 in the unlicensed band. The electronic apparatus 102 may support carrier aggregation. The licensed band may be set in P-cell of a plurality of carriers. The unlicensed band may be set in S-cell.

A network established by the (BSs) 110 and 120 may be referred to as a "first network". The BS 110 may transmit or receive a signal to or from the electronic apparatus 102 in the licensed band. The BS 110 may be referred to as a "BS, evolved nodeB (eNB), or BS". The BS 120 may transmit or receive a signal to or from an electronic apparatus 104 in the unlicensed band. The BS 120 may be referred to as a "BS, eNB, BS, licensed-assisted access (LAA) BS, long term evolution-unlicensed (LTE-U) BS, or the like".

An access point (AP) 130 may be a device that connects wireless devices to a wired device using a standard (e.g., institute of electrical and electronics engineers (IEEE) 802.11) related to wireless fidelity (Wi-Fi) or the like. The AP 130 may be referred to as a "BS, centralized controller, node B, or eNB". A network established by the AP 130 may be referred to as a "second network". The electronic apparatus 104 may perform second network communication through the AP 130.

In an embodiment, the first network may be at least one of long term evolution (LTE), LTE-advanced (LTE-A), LTE-U, or LTE LAA. The LTE-related system may adopt orthogonal frequency division multiple access (OFDMA) in a downlink and may adopt single carrier frequency division multiple access (SC-FDMA) in an uplink, as a part of evolved universal mobile telecommunications system (E-UMTS) using evolved universal terrestrial radio access (E-UTRA).

In an embodiment, the second network may be a wireless local area network (WLAN). The WLAN may be based on the IEEE 802.11 standard and may be referred to as "Wi-Fi".

Hereinafter, according to an embodiment of the present disclosure, the BS 120 and the electronic apparatus 102 will be described. The BS 120 may be a BS supporting the LTE LAA or the LTE-U system.

In an embodiment, the LTE LAA or the LTE-U system may use a resource structure of an LTE system. In the LTE system, a downlink subframe may be composed of two consecutive slots in the time domain. The subframe 'i' may be composed of slot '2i' and slot '2i+1'. Hereinafter, the first slot of each subframe may be referred to as "slot 0", and the second slot thereof may be referred to as "slot 1".

One slot may include a plurality of orthogonal frequency division multiplexing (OFDM) symbols in the time domain. In the case of a normal cyclic prefix (CP), one slot may include seven OFDM symbols. An LTE LAA operation may be performed on a subframe having the normal CP.

Figure 2:
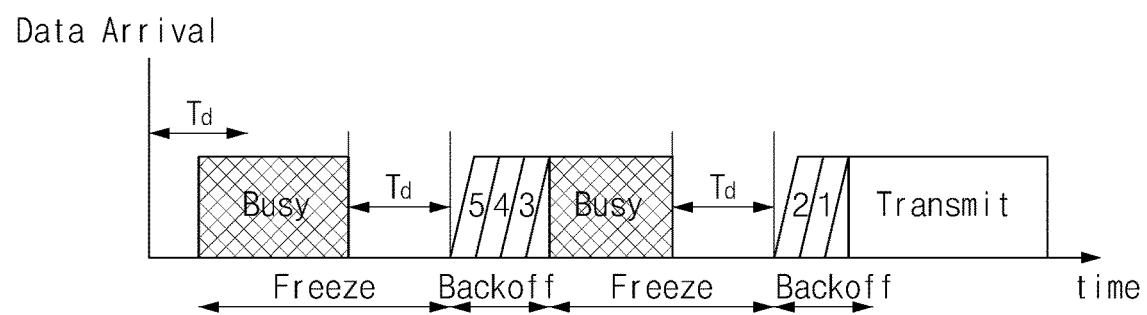
FIG. 2 is a view for describing a listen-before-talk (LBT) operation in a licensed-assisted access (LAA) base station (BS) according to an embodiment of the present disclosure.

FIG. 2 is a view for describing an operation of performing listen-before-talk (LBT) in the LAA BS 120 according to an embodiment of the present disclosure.

Referring to FIG. 2, the LAA BS 120 may perform the LBT before starting the downlink transmission in the unlicensed band. The LBT is an operation of determining whether any other transmitter device already occupies a channel before the LAA BS 20 starts the transmission and performing the transmission in the case where it is determined that the other transmitter device does not occupy the channel.

The LAA BS 120 may perform an operation of determining the state of a wireless channel, as an LBT operation. This operation may be referred to as "clear channel assessment (CCA)". In the present disclosure, two schemes may be used for the CCA. In an embodiment, a CCA scheme that is based on energy detect (ED) determined based on the strength of a reception signal may be used for the CCA. In this case, a received signal strength indicator (RSSI) may be used as an indicator of received signal strength. In another embodiment, the CCA may be a carrier sense (CS)-based CCA. As an example of CS, there is a method of calculating the duration of a frame based on a length field in a preamble or a length field in a header. Hereinafter, the CS may be referred to as "sensing".

In an embodiment, the LAA BS 120 performing CCA may determine whether the state of a channel is in an idle state or a busy state, based on the strength of a reception signal. If the strength of a reception signal satisfies a specified level (e.g., in the case where the strength is less than a threshold value or the strength is not greater than the threshold value) during a preset time (e.g., 4 μs), the LAA BS 120 performing the CCA may determine that a channel state is an idle state. In the case where the strength of the reception signal does not satisfy the specified level during the preset time, the LAA BS 120 may determine that the channel state is a busy state.

In an embodiment, the LAA BS 120 may not perform transmission in the case where the specific channel is in the busy state and may perform the transmission in the case where the specific channel is in the idle state. The LAA BS 120 may perform a backoff operation for the purpose of performing the transmission. The LAA BS 120 may set a counter of "N" to a random value before starting the transmission. If the channel is in the idle state during slot duration $T_{sl}$, the LAA BS 120 may decrease the counter by "1". This process may be referred to as "backoff". In the case where the channel state is in the busy state, the LAA BS 120 may freeze the counter and may wait until the channel is in the idle state. The LAA BS 120 may start the transmission as soon as the counter becomes "0".

The LAA BS 120 may measure the received signal strength during a preset time CCA Time for determining the idle state. In the case where the received signal strength is not maintained during a preset time duration to be less than a threshold value, the LAA BS 120 may determine that the channel is in the busy state. In the case where a state where the received signal strength is less than the threshold value is maintained during the preset time duration, the LAA BS 120 may wait during a predetermined time $T_d$ before performing the backoff operation. Referring to FIG. 2, it is assumed that the counter is "5" before it is determined that the channel is in the busy state. The LAA BS 120 may freeze the counter during a time duration during which the channel is in the busy state and may perform the backoff operation again after the time duration $T_d$. If it is determined based on the received signal strength that the channel is in the idle state, after performing the backoff operation, the LAA BS 120 may decrease the counter to "4" after slot duration T elapses. In the case where the received signal strength is not less than the threshold value in a state where the counter is "3", the LAA BS 120 may determine that the channel state is the busy state and may freeze the counter while the channel state is the busy state. In the case where the state where the received signal strength is less than the threshold value is maintained again during the preset time duration, the LAA BS 120 may decrease the counter being "3" to "2". If it is determined based on the received signal strength that the channel is in the idle state in a state where the counter is "1", after slot duration $T_{sl}$ elapses, the LAA BS 120 may decrease the counter to "0" and may perform the transmission at a point in time when the counter becomes "0".

The point in time when the counter becomes "0" may not coincide with the starting time point of a subframe or a slot. In this case, the LAA BS 120 may not transmit data at once and may transmit the data at the starting time point of the subframe or slot. The LAA BS 120 may transmit a dummy signal, which is a meaningless signal, from a point in time when the counter becomes "0" to the starting time point of the next subframe or slot. In the present disclosure, the subframe and/or the slot may correspond to the subframe and slot of an LTE system.

After transmitting the dummy signal, the LAA BS 120 may transmit a reference signal at the starting time point of the subframe or slot. The reference signal may be used to provide notification of the starting of the transmission.

Figure 3:
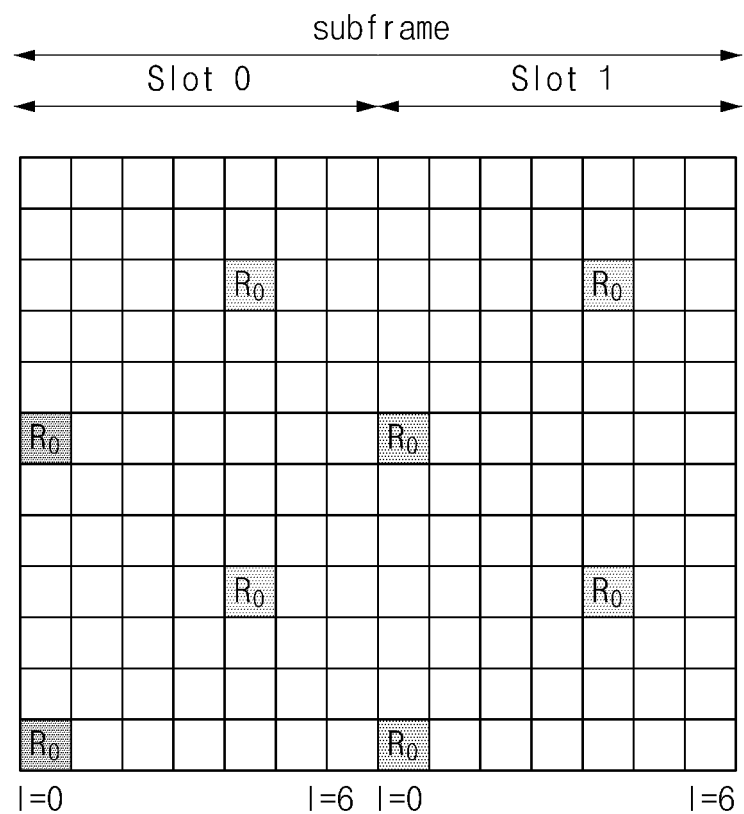
FIG. 3 illustrates a pattern of a reference signal capable of being applied according to an embodiment of the present disclosure.

FIG. 3 illustrates an example of a pattern of a reference signal applied according to an embodiment of the present disclosure.

The reference signal may be a signal that is used to obtain channel information or to demodulate data. A type of the reference signal may be a cell-specific reference signal (CRS), a demodulation reference signal (DM-RS), a channel state information references signal (CSI-RS), or the like.

The CRS may be transmitted in all downlink subframes in a cell supporting the transmission of a physical downlink data channel. The CRS may be transmitted by one or more of antenna ports 0 to 3. The CRS may be used to measure the channel or to obtain the channel information.

FIG. 3 illustrates a CRS pattern defined with respect to antenna port 0 according to an embodiment of the present disclosure. With regard to antenna port 0, the CRS may be mapped to the resource element on a subframe depending on the CRS pattern. Referring to FIG. 3, the CRS pattern of antenna port 0 is displayed as "R0". As such, the CRS may be transmitted during the duration of the first symbol and the duration of the fifth symbol of each of slot 0 and slot 1.

Hereinafter, according to another embodiment of the present disclosure, various methods are described based on the case where the BS 120 transmits the CRS by the antenna port 0. However, the patterns of various reference signals will be applied to a signal detecting method described in the present disclosure.

The electronic apparatus 102 may perform blind detection on the reference signal for the purpose of determining whether there is a signal received from the LAA BS 120. The electronic apparatus 102 may sense the channel to determine whether the reference signal is transmitted. In the case where the reference signal from the LAA BS 120 is present, the electronic apparatus 102 may determine that there is a signal to be received, and may receive the signal from the LAA BS 120 during a subframe duration or a slot duration. In the case where it is determined that there is no reference signal being transmitted, the electronic apparatus 102 may determine that there is no signal to be received, and may change an operating mode or a communication mode with the LAA BS 120.

The operating mode or the communication mode may be a first mode or a second mode. The first mode may be a wakeup mode. In the wakeup mode, the electronic apparatus 102 may communicate with the LAA BS 120. In the wakeup mode, the electronic apparatus 102 may set wireless connection to the LAA BS 120. The second mode may be the operating mode of power lower than the wakeup mode. The second mode may be a sleep mode. The sleep mode may indicate a state in which the electronic apparatus 102 operates with power lower than the wake-up mode. The sleep mode may indicate that the unused module is powered off. The sleep mode may include the case where the power of a module is "0". The sleep mode may include the case where the signal from the LAA BS 120 is not received. Hereinafter, in the present disclosure, the wakeup mode may be referred to as the "first mode", and the sleep mode may be referred to as the "second mode".

The electronic apparatus 102 may perform blind detection on the reference signal in a specific symbol of a plurality of symbols included in the subframe or slot. In an embodiment, the specific symbol may be the first symbol. In an embodiment, the reference signal may be the CRS. In the case where the reference signal is transmitted during the duration of the first symbol (hereinafter, referred to as "symbol 0") depending on the blind detection, the electronic apparatus 102 may determine whether the channel is in a busy state during the duration of symbol 0. Alternatively, in the case where the signal reception strength is not less than a threshold value in a channel during the duration of symbol 0, the electronic apparatus 102 may determine that the channel is in the busy state. If the case where the channel is in an idle state is present during the duration of symbol 0, the electronic apparatus 102 may determine that the reference signal is not transmitted during the duration of the corresponding symbol. In this case, the electronic apparatus 102 may determine that the transmission from the LAA BS 120 is not performed.

Figure 4:
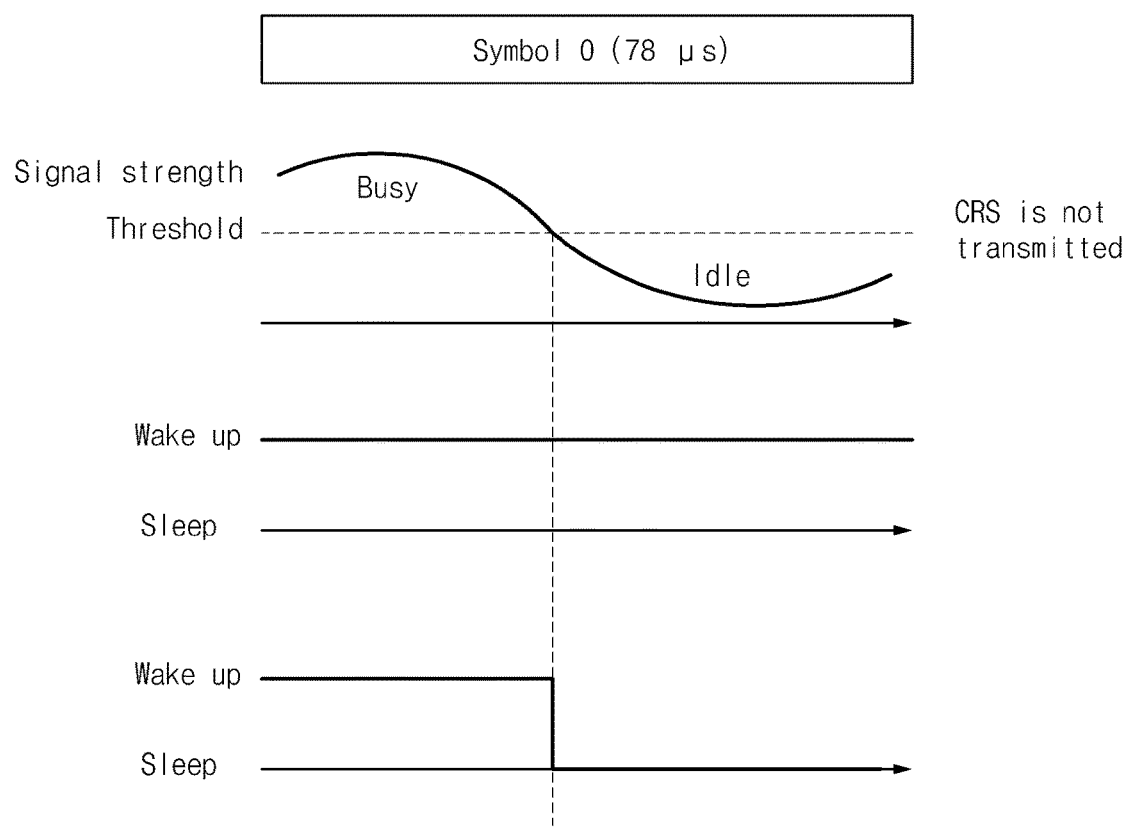
FIG. 4 is a view for describing a relation between received signal strength and an operation of an electronic apparatus according to an embodiment of the present disclosure.

FIG. 4 is a view for describing a relation between received signal strength and an operation of an electronic apparatus according to an embodiment of the present disclosure.

Referring to FIG. 4, the operation of an electronic apparatus will be described in the case where a channel is in the busy state in a partial duration of symbol 0 and then the channel is in the idle state in the remaining duration. According to an embodiment, the electronic apparatus 102 may maintain the operating mode as the first mode during the whole duration of symbol 0. After the whole duration of symbol 0 ends, the electronic apparatus 102 may switch the operating mode from the first mode to the second mode. The electronic apparatus 102 switched to the second mode may not receive a signal from the LAA BS 120 anymore. According to an embodiment, the electronic apparatus 102 may maintain a module that receives a LTE signal in the first mode even during a duration that is in the idle state. As a result, the electronic apparatus 102 may consume power unnecessarily.

According to an embodiment of the present disclosure, in the case where the state of a channel is a busy state during a partial duration of symbol 0 and then is changed to the idle state, the electronic apparatus 102 may change the operating mode to the second mode even in the case where the duration of symbol 0 does not end. The electronic apparatus 102 may perform CCA; if it is determined that the channel is in the idle state, the electronic apparatus 102 may determine that the CRS is not transmitted. The electronic apparatus 102 may switch the mode of a cellular module to the second mode at a point in time when the duration of symbol 0 does not end.

Figure 5:
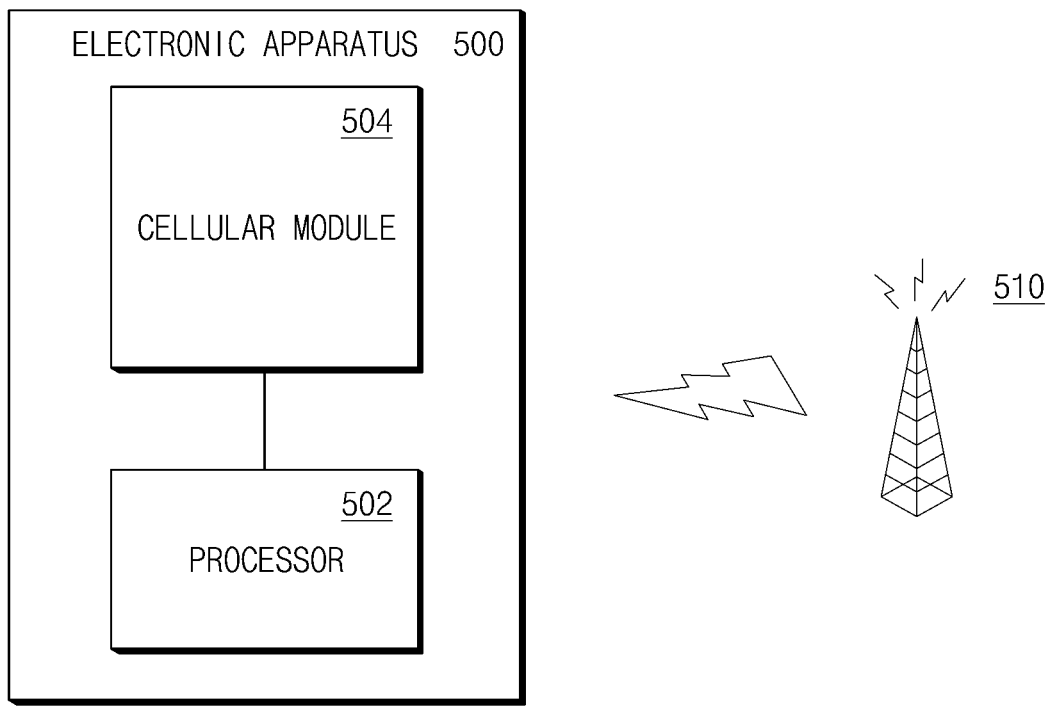
FIG. 5 is a block diagram illustrating a configuration of an electronic apparatus according to an embodiment of the present disclosure.

FIG. 5 is a block diagram illustrating a configuration of an electronic apparatus according to an embodiment of the present disclosure.

Referring to FIG. 5, an electronic apparatus 500 may include a processor 502 and a cellular module 504. The electronic apparatus 500 may transmit or receive a signal to or from a BS 510 through the cellular module 504.

The processor 502 may perform various operations according to an embodiment of the present disclosure and may control the cellular module 504. In an embodiment, in the case where it is determined that a channel is idle, the processor 502 may switch an operating mode of the cellular module 504. The processor 502 may operate the cellular module 504 in a first mode during a partial duration of a specific symbol and may operate the cellular module 504 in a second mode during the remaining duration of the specific symbol.

The processor 502 may include one or more of a CPU, an AP, or a communication processor (CP). The processor 502 may perform, for example, data processing or an operation associated with control or communication of at least one other element(s) of the electronic apparatus 500.

The processor 502 may drive an operating system (OS) or an application program to control a plurality of hardware or software components connected to the processor 502 and may process and compute a variety of data. For example, the processor 502 may be implemented with a system on chip (SoC). The processor 502 may load and process an instruction or data, which is received from at least one of other elements (e.g., a nonvolatile memory), and may store a variety of data at a nonvolatile memory.

The cellular module 504 may transmit or receive a signal to or from the BS 510 in an unlicensed band. The cellular module 504 may be a cellular module 501 of FIG. 6. The cellular module 504 may transmit or receive a signal to or from the BS 510 through cellular communication. The BS 510 may be an LAA BS or an LTE-U base station.

According to an embodiment of the present disclosure, the cellular module 504 may perform at least some of functions that the processor 502 provides. According to an embodiment, the cellular module 504 may include a CP. For example, in the case where it is determined that the channel is idle, the operating mode of the cellular module 504 may be switched. The cellular module 504 may operate in the first mode during a partial duration of a specific symbol and may operate in the second mode during the remaining duration of the specific symbol.

The cellular module 504 may transmit or receive a radio frequency (RF) signal through a separate RF module. The RF module may transmit and receive, for example, a communication signal (e.g., an RF signal). For example, the RF module may include a transceiver, a power amplifier module (PAM), a frequency filter, a low noise amplifier (LNA), an antenna, or the like.

Figure 6:
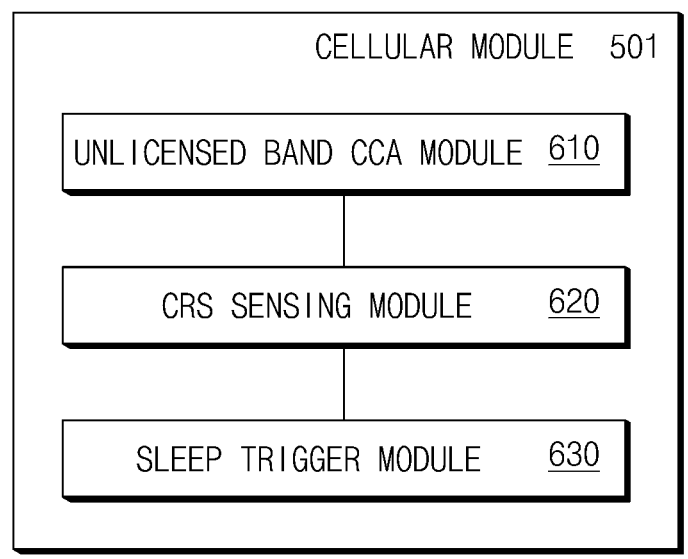
FIG. 6 is a block diagram illustrating a function configuration of a cellular module according to an embodiment of the present disclosure.

FIG. 6 is a block diagram illustrating a function configuration of a cellular module according to an embodiment of the present disclosure.

Referring to FIG. 6, the cellular module 501 may include an unlicensed band CCA module 610, a CRS sensing module 620, and/or a sleep trigger module 630.

The unlicensed band CCA module 610 may be a module performing CCA on an unlicensed band. The unlicensed band CCA module 610 may measure a channel state with respect to the unlicensed band. The unlicensed band CCA module 610 may measure received signal strength with respect to the unlicensed band. In an embodiment, the unlicensed band CCA module 610 may perform energy detection (ED)-based CCA.

In an embodiment, the CRS sensing module 620 may determine whether a CRS is present in a specific symbol, based on the channel state measured by the unlicensed band CCA module 610. The CRS sensing module 620 may determine whether the CRS is present in the specific symbol, based on the measured received signal strength. For example, in the case where the measured received signal strength is less than a threshold value, the CRS sensing module 620 may determine that there is no CRS in the specific symbol. In the case where the measured received signal strength is not less than a threshold value, the CRS sensing module 620 may determine that the CRS is present in the specific symbol.

The sleep trigger module 630 may trigger the second mode before the duration of symbol 0 ends. The sleep trigger module 630 may switch an operating mode from the first mode to the second mode. Herein, the second mode may be a sleep mode. Symbol 0 may be divided into a partial duration operating in the first mode and the remaining duration operating in the second mode.

A partial configuration of the cellular module 501 may be implemented by the processor 502.

Figure 7:
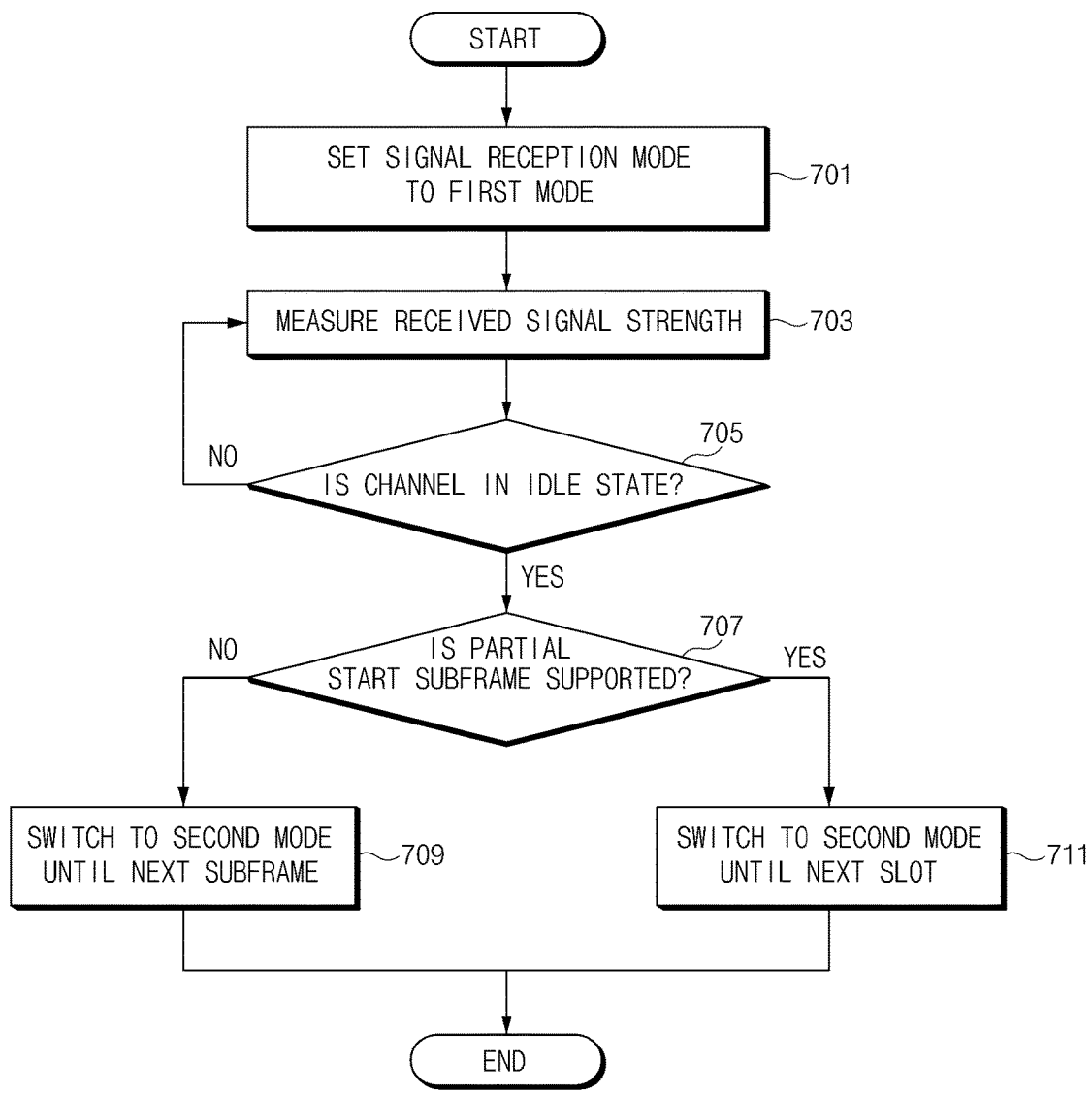
FIG. 7 is a flowchart of a reception operation of an electronic apparatus in an unlicensed band according to an embodiment of the present disclosure.

FIG. 7 is a flowchart of a reception operation of an electronic apparatus in an unlicensed band according to an embodiment of the present disclosure.

Referring to FIG. 7, in operation 701, the electronic apparatus 500 may operate in a first mode. For example, the electronic apparatus 500 may set the mode of the cellular module 504 to the first mode.

In operation 703 and 705, the electronic apparatus 500 may perform CCA based on a reception signal. In an embodiment, the CCA may be an ED-based CCA scheme. In particular, in operation 703, the electronic apparatus 500 may measure received signal strength. The electronic apparatus 500 may measure the reception signal during a preset time. In operation 705, the electronic apparatus 500 may determine whether a channel is in an idle state. In an embodiment, in the case where received signal strength is maintained during the preset time to be not greater than a threshold value, the electronic apparatus 500 may determine whether the channel is in the idle state. Alternatively, the electronic apparatus 500 may determine that a CRS is not transmitted. In the case where the received signal strength is not maintained during the preset time to be not greater than a threshold value, the electronic apparatus 500 may determine whether the channel is not in the idle state. In this case, the channel state may be referred to a "busy state". In the case where the channel state is the busy state, the electronic apparatus 500 may perform operation 703.

In the case where the channel state is the idle state, the electronic apparatus 500 may switch an operating mode from the first mode to a second mode. The electronic apparatus 500 may switch the mode of the cellular module 504 to the second mode. In an embodiment, the electronic apparatus 500 may drive the cellular module 504 with power lower than the power of the first mode. In an embodiment, the electronic apparatus 500 may receive a signal with power lower than the power of the first mode or may not receive the signal. The first mode may be a wakeup mode, and the second mode may be a sleep mode.

A duration operating in the second mode may be determined based on whether a partial start subframe is supported. In operation 707, the electronic apparatus 500 may determine whether the partial start subframe is supported. In the case where the electronic apparatus 500 supports the partial start subframe, the electronic apparatus 500 may perform operation 711. The electronic apparatus 500 may operate in the second mode until the next slot. In the case where the electronic apparatus 500 does not support the partial start subframe, the electronic apparatus 500 may perform operation 709. The electronic apparatus 500 may operate in the second mode until the next subframe.

FIGS. 8 to 11 are views for describing the operation of the electronic apparatus 500 or the cellular module 504 according to various situations. The LBT operation of the BS 510 and the operation of the electronic apparatus 500 according to a data transmission operation based on the LBT will be described with reference to FIGS. 8 to 11.

Figure 8:
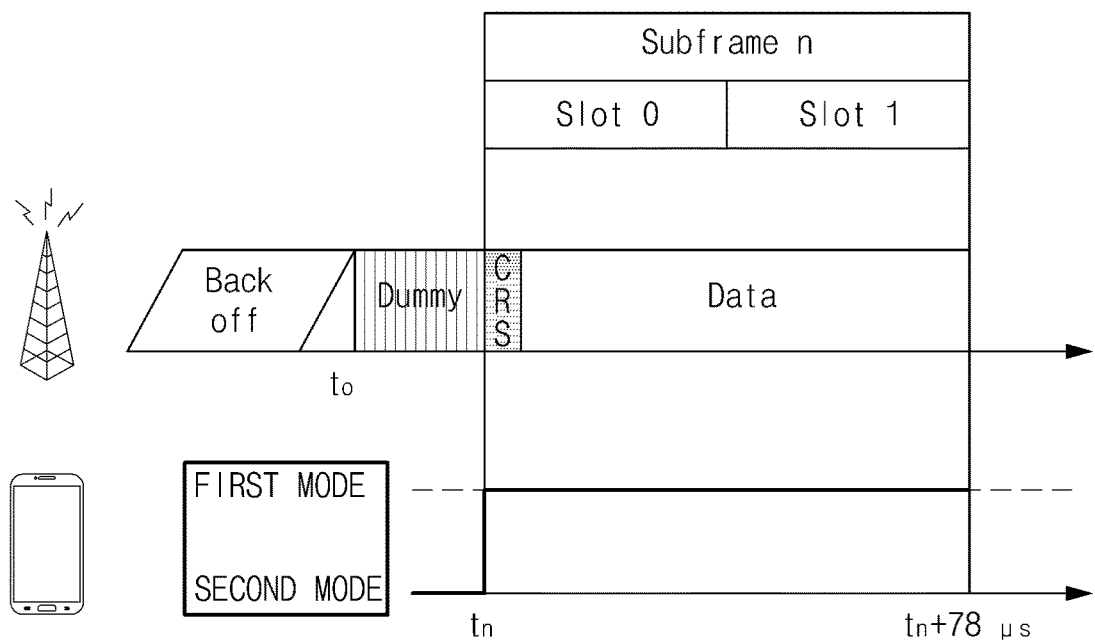
FIG. 8 illustrates the state of a cellular module of an electronic apparatus according to an embodiment of the present disclosure.

FIG. 8 illustrates the state of a cellular module of an electronic apparatus according to an embodiment of the present disclosure.

In the case where it is determined depending on an LBT operation that a channel is not occupied by another BS or the like, the BS 510 may transmit a dummy signal.

Referring to FIG. 8, the BS 510 may transmit the dummy signal from time to being a point in time when a counter becomes "0" to time t being a starting time point of subframe 'n'. The BS 510 may start the transmission at a boundary of a subframe. The BS 510 may transmit a CRS and then may transmit data. The BS 510 may transmit the CRS during the duration of one symbol of a plurality of symbols constituting a subframe. The BS 510 may transmit the CRS during the duration of symbol 0 being the first symbol of the plurality of symbols. The BS 510 may transmit the data during the duration of at least one symbol, other than the symbol 0, from among the plurality of symbols.

The electronic apparatus 500 may set the operating mode to the first mode at a point in time when the subframe is started (e.g., time $t_n$). In an embodiment, the electronic apparatus 500 may set the operating mode from the second mode to the first mode. In an embodiment, the electronic apparatus 500 may set the operating mode of the cellular module 504 to the first mode. Referring to FIG. 8, since the channel remains in a busy state during the duration of symbol 0, the electronic apparatus 500 may remain in the first mode until the duration of symbol 0 ends. In the case of FIG. 8, the electronic apparatus 500 may not perform an operation in which the second mode is early switched in the middle of the duration of symbol 0.

Figure 9:
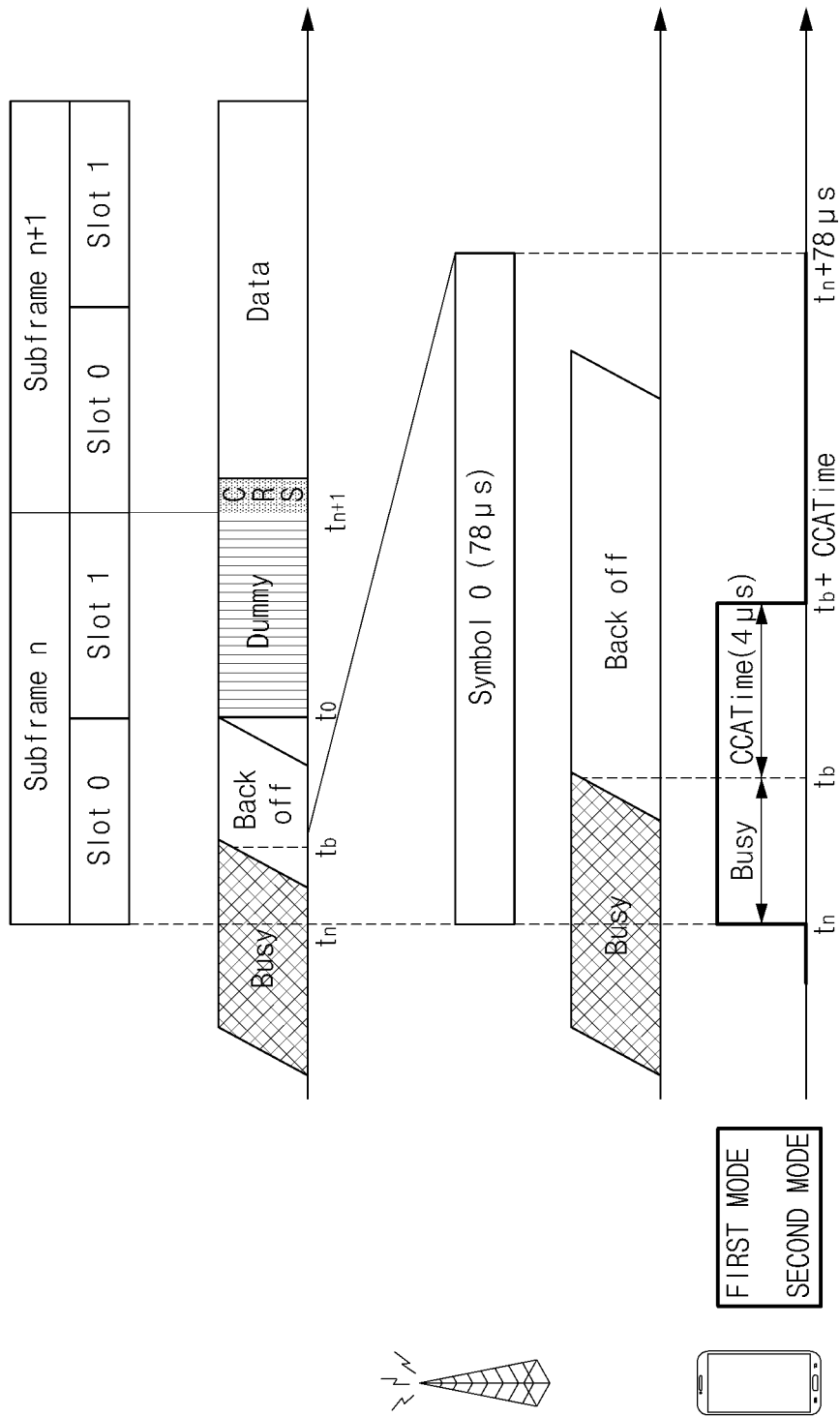
FIG. 9 illustrates another example of a state switching operation of a cellular module of an electronic apparatus according to an embodiment of the present disclosure.

FIG. 9 illustrates another example of a state switching operation of a cellular module of an electronic apparatus according to an embodiment of the present disclosure.

Referring to FIG. 9, while determining that a channel is in a busy state during the duration of symbol 0 of subframe 'n', the BS 510 may perform a backoff operation. In the case where the channel is in the busy state, the BS 510 may maintain a counter in a freeze state uniformly. If the state of the channel becomes an idle state again, the BS 510 may resume the backoff operation. If it is determined that the channel is in the idle state, the BS 510 may perform the backoff operation at time $t_b$. The BS 510 may transmit a dummy signal from time to being a point in time when a counter becomes "0" to time $t_{n+1}$ being a starting time point of subframe 'n+1'. The BS 510 may start the transmission in subframe 'n+1'. The BS 510 may transmit a CRS and then may transmit data. Time to may be a time point located in the duration of the first symbol of the subframe.

The electronic apparatus 500 may set the operating mode to the first mode at time t being a subframe boundary. In this case, the subframe may be a downlink subframe. The electronic apparatus 500 may determine that the channel is in the busy state from time $t_n$ to time $t_b$. Since a BS performs a backoff operation, the electronic apparatus 500 may determine that received signal strength measured at a specific time point (e.g., $t_b$) is not greater than a threshold value. Herein, the specific time point may be a time point located in a first symbol duration of the subframe. The electronic apparatus 500 may determine whether the received signal strength satisfies a specified level during a preset time.

Referring to FIG. 9, since the received signal strength is not greater than the threshold value during the preset time, the electronic apparatus 500 may switch the operating mode from the first mode to the second mode. For example, the preset time may be set as a value of 'CCAtime'. For example, the preset time may be 4 is.

In the case where it is determined that the channel is in the idle state within specific symbol 0, the electronic apparatus 500 may operate in the second mode during the remaining duration other than a partial duration that operates in the first mode during the duration of the symbol 0. The partial duration may correspond to a time period from a starting time point $t_n$ of subframe 'n' to time '$t_b$+CCAtime' being point in time when the preset time elapses. Time '$t_b$+CCAtime' may be a value less than time '$t_n$+78 μs' being at a point in time when the duration of the symbol 0 ends. Herein, 78 μs may correspond to the length of an OFDM symbol of an LTE system.

The electronic apparatus 500 may maintain the operating mode as the second mode until the subframe 'n' ends. The electronic apparatus 500 may switch the operating mode to the first mode at time $t_{n+1}$ when subframe 'n+1' is started, and may monitor a channel state. The electronic apparatus 500 may measure the received signal strength from time $t_{n+1}$.

The operation of the electronic apparatus 500 in the case where the electronic apparatus 500 does not support a partial start subframe is described with reference to FIG. 9.

Figure 10:
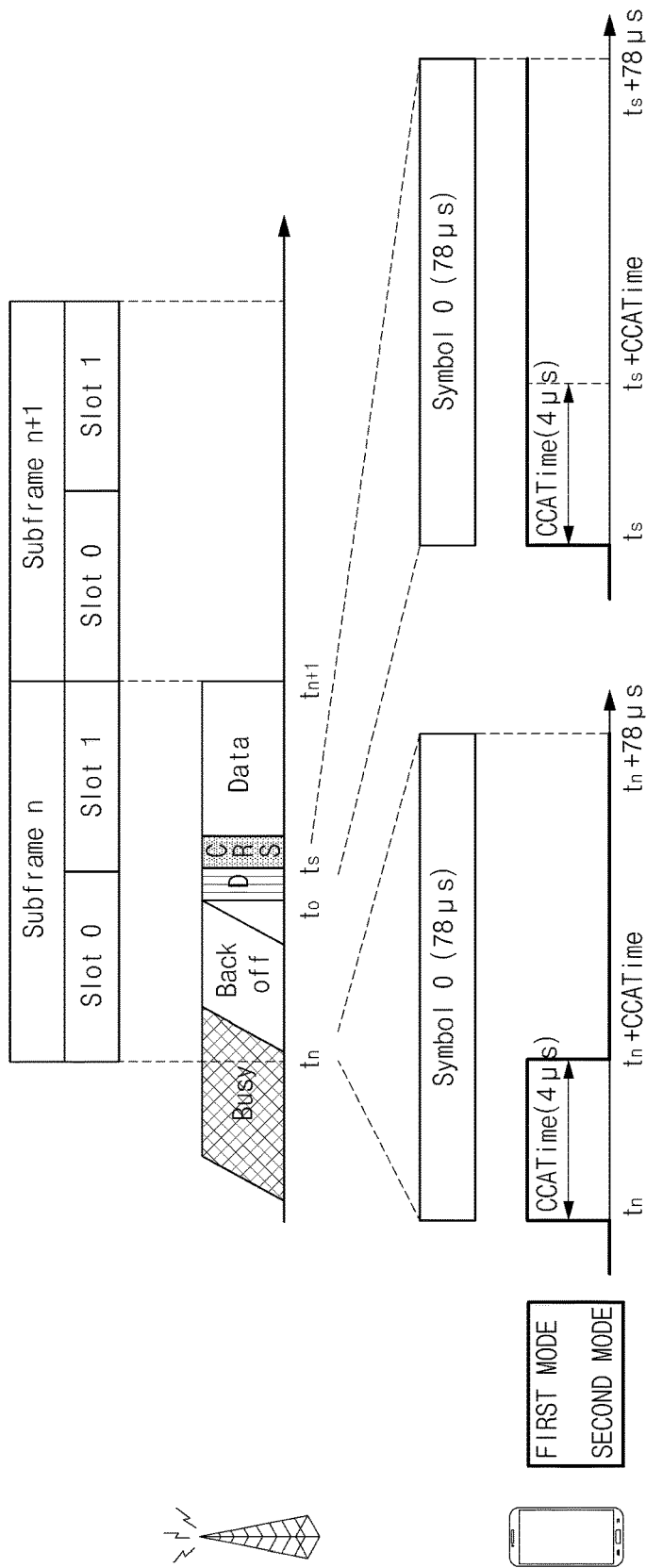
FIG. 10 illustrates still another example of a state switching operation of a cellular module of an electronic apparatus according to an embodiment of the present disclosure.

FIG. 10 is a view for describing an operation of the electronic apparatus 500 in the case where the electronic apparatus 500 supports a partial start subframe according to an embodiment of the present disclosure.

The BS 510 may perform transmission in units of slot in the partial start subframe. Even in the case where the BS 510 does not perform the transmission during a duration of slot 0, the BS 510 may perform the transmission during a duration of slot 1. Since the operation of a BS during the duration of slot 0 in FIG. 10 is the same as the operation in FIG. 9, a detailed description thereof is thus omitted.

The BS 510 may start the transmission during slot 1. The BS 510 may start the transmission at time $t_s$ being a starting time point of slot 1. The BS 510 may transmit a CRS during a specific symbol of symbols constituting slot 1. The BS 510 may transmit the CRS during symbol 0 being a first symbol of slot 1, and may transmit data during at least one symbol of the remaining symbols.

Since the operation during slot 0 of the electronic apparatus 500 is the same as the operation during slot 0 of the electronic apparatus 500 in FIG. 9, a detailed description thereof is thus omitted. The electronic apparatus 500 may maintain an operating mode as a second mode during a partial duration of slot 0.

The electronic apparatus 500 may switch the operating mode to the first mode at time $t_s$ when slot 1 is started, and may monitor a channel state. The electronic apparatus 500 may measure the received signal strength from time $t_s$. The electronic apparatus 500 may switch the operating mode of the cellular module 504 to the first mode and may perform blind detection on the CRS. For example, the electronic apparatus 500 may switch the operating mode of the cellular module 504 to the first mode and may perform CCA. Referring to FIG. 9, since the BS 510 transmits the CRS during slot 1, the electronic apparatus 500 may detect the CRS and may receive a signal received from the BS 510.

Figure 11:
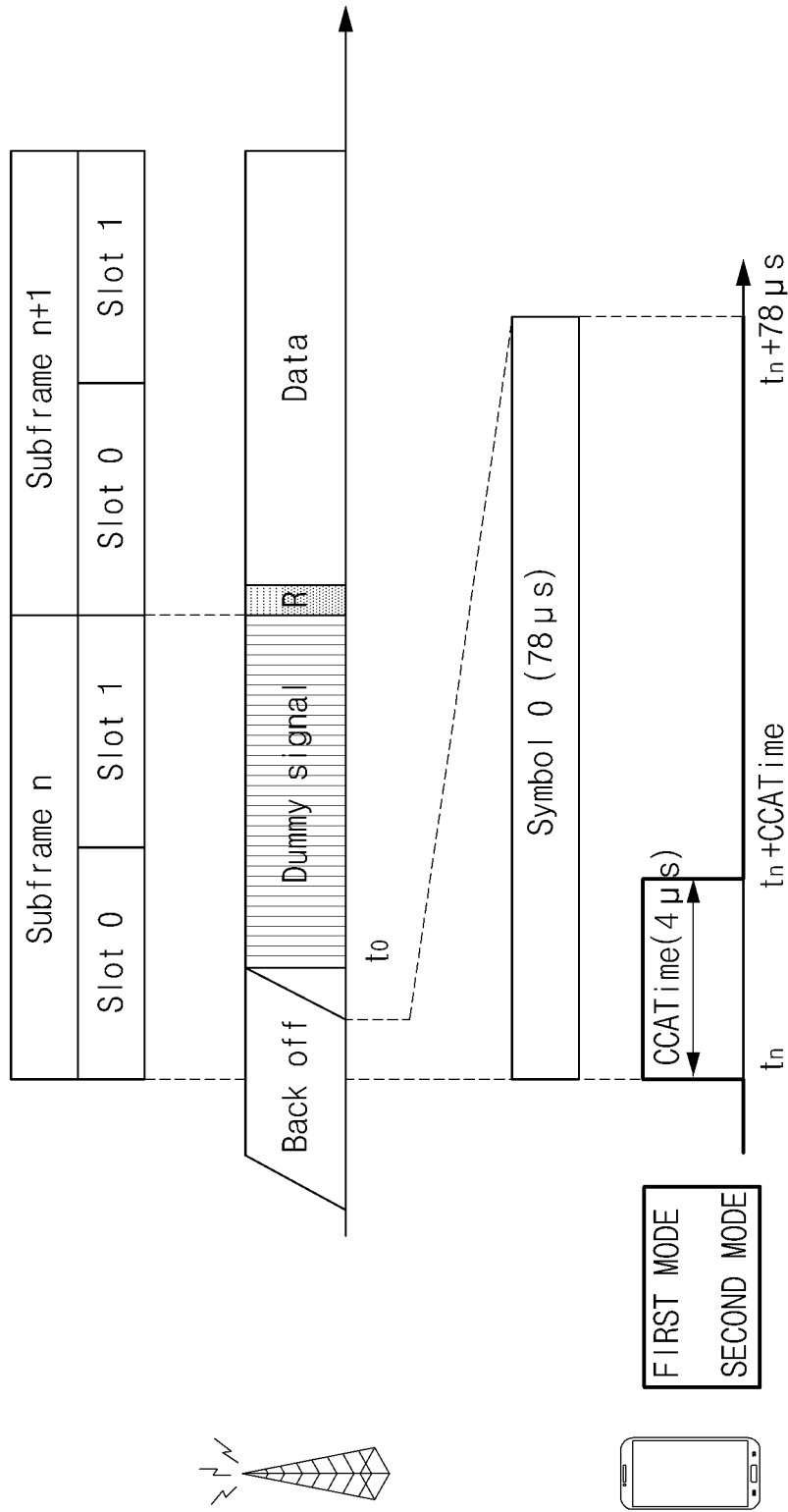
FIG. 11 illustrates still another example of a state switching operation of a cellular module of an electronic apparatus according to an embodiment of the present disclosure.

FIG. 11 illustrates an operation of the electronic apparatus 500 in the case where the BS 510 performs a backoff operation at a starting time point of subframe 'n' according to an embodiment of the present disclosure.

Referring to FIG. 11, the BS 510 may perform a backoff operation at a starting time point of subframe 'n' and may transmit a dummy signal from time to when a counter becomes '0' to time $t_{n+1}$ being the starting time point of subframe 'n+1'. The BS 510 may transmit a signal from the start of subframe 'n+1'. For example, after transmitting a CRS during symbol 0 being a first symbol of subframe 'n+1', the BS 510 may transmit data.

The electronic apparatus 500 may set an operating mode to a first mode at time t being the starting time point of subframe 'n'. The electronic apparatus 500 may perform CCA from time $t_n$. Since the BS 510 performs a backoff operation at time $t_n$, the electronic apparatus 500 may determine that signal reception strength is not greater than a threshold value. In the case where the signal reception strength is maintained during a preset time to be not greater than the threshold value, the electronic apparatus 500 may switch the operating mode from the first mode to a second mode. The required time in FIG. 11 that is from the starting time point of a subframe to a time point when the electronic apparatus 500 switches the operating mode is shorter than the required time in FIGS. 8 to 10. For example, in the case where a preset time elapses from the starting time point of a subframe, the electronic apparatus 500 may switch the operating mode. Referring to FIG. 11, the power saving effect of the electronic apparatus may be maximized.

According to an embodiment of the present disclosure, in the case where a channel is in an idle state during symbol 0, a cellular module may switch the operating mode from the first mode to the second mode during symbol 0. As such, the power consumption may be reduced as compared with the conventional technology that remains in the first mode during the whole duration of symbol 0.

Meanwhile, the case where a heterogeneous network or a heterogeneous communication system occupies a channel may occur independently of whether a BS performing cellular communication occupies the channel. Hereinafter, the heterogeneous network or the heterogeneous communication system may be referred to as a "second network". Even in the case where it is expected that the transmission of the BS is not performed because the second network occupies the channel, a conventional electronic apparatus performs CCA on the channel, thus wasting power unnecessarily. An embodiment of the present disclosure provides a method in which an electronic apparatus senses and predicts whether a channel is used for second network communication and which saves power consumed due to the CCA. Hereinafter, the case where the second network is a WLAN (e.g., Wi-Fi) will be described.

Figure 12:
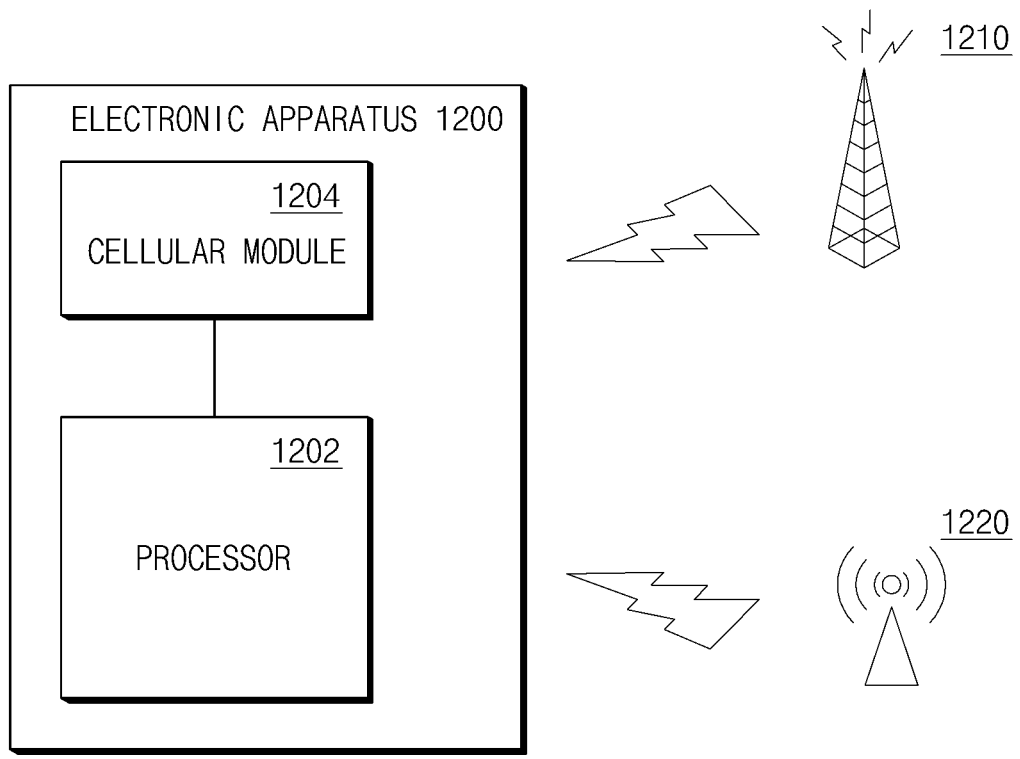
FIG. 12 is a block diagram illustrating a configuration of an electronic apparatus according to an embodiment of the present disclosure.

FIG. 12 is a block diagram illustrating a configuration of an electronic apparatus according to an embodiment of the present disclosure.

Referring to FIG. 12, an electronic apparatus 1200 may include a processor 1202 and/or a cellular module 1204. Hereinafter, other than the descriptions about the processor 1202 and the cellular module 1204 which are described below, the duplicated portions may refer to the descriptions about the processor 502 and the cellular module 504 in FIG. 5.

The cellular module 1204 may perform cellular communication with a BS 1210 in an unlicensed band. The BS 1210 may be at least one of base stations supporting LTE, LTE-A, or LTE-U. The BS 1210 may be a BS performing LAA. The cellular module 1204 may be connected to a first network established by the BS 1210. The cellular module 1204 may be referred to as a "first network module".

In an embodiment, the cellular module 1204 may execute at least part of functions of the processor 1202. The cellular module 1204 may perform ED-based CCA. The cellular module 1204 may detect a signal from the second network in the unlicensed band. The cellular module 1204 may detect a reference signal or a preamble received from the second network. The cellular module 1204 may detect a signal or a preamble received through an AP 1220. The cellular module 1204 may include a Wi-Fi preamble detection filter that detects the preamble received from the AP 1220.

The AP 1220 may establish the first network and the second network being a heterogeneous network.

Figure 13:
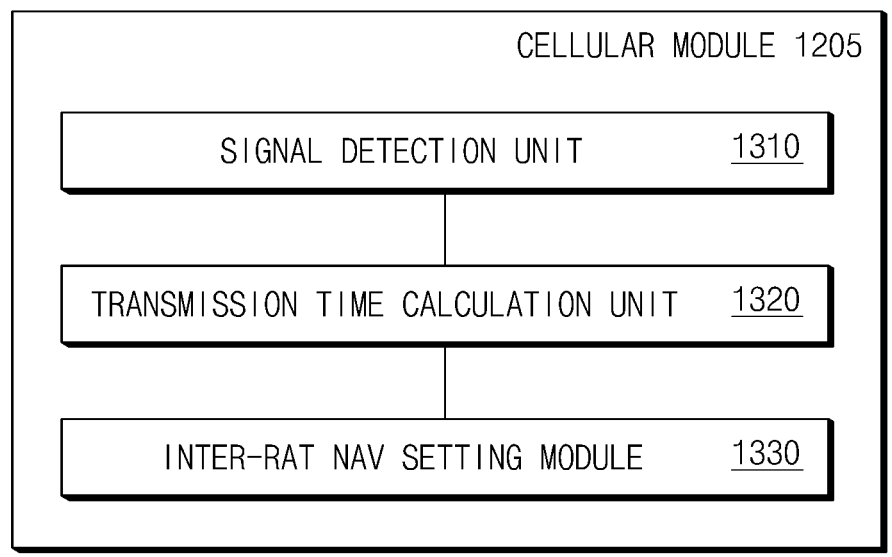
FIG. 13 is a block diagram illustrating an example of a function configuration of a cellular module according to an embodiment of the present disclosure.

FIG. 13 is a block diagram illustrating an example of a function configuration of a cellular module according to an embodiment of the present disclosure.

A cellular module 1205 may detect a signal of a heterogeneous network (Wi-Fi) different from a cellular network (e.g., LTE), by adding a filter for detecting Wi-Fi to the interior of the cellular module 1205. In an embodiment, the filter for detecting a Wi-Fi preamble may be added to the cellular module 1205.

Referring to FIG. 13, the cellular module 1205 may include a signal detection unit 1310, a transmission time calculation unit 1320, and an inter-radio access technology (RAT) network allocation vector (NAV) setting module 1330.

The signal detection unit 1310 may detect a signal of a second network during a first duration. The signal of the second network may be a reference signal or a preamble. In an embodiment, the second network may be a WLAN (e.g., Wi-Fi). In an embodiment, the preamble may be a Wi-Fi preamble. The signal detection unit 1310 may include a Wi-Fi preamble detection filter.

The transmission time calculation unit 1320 may calculate a channel occupation time of the second network. The transmission time calculation unit 1320 may calculate a transmission time when the second network performs transmission, based on the reference signal or the preamble.

The inter-RAT NAV setting module 1330 may set a channel state to a busy state during a second duration based on the calculated transmission time. The inter-RAT NAV setting module 1330 may switch an operating mode from the first mode to the second mode based on the calculated transmission time. In an embodiment, the inter-RAT NAV setting module 1330 may set NAV such that a mode is switched. The NAV may indicate time information for providing notification that a channel is being used. An inter-RAT NAV may be time information for occupying the channel in the second network. In an embodiment, the first mode may be a wakeup mode in which a channel state is measured. In an embodiment, the second mode may be a sleep mode in which a channel state is not measured.

A partial configuration of the cellular module 1205 may be implemented by the processor 1202.

Figure 14:
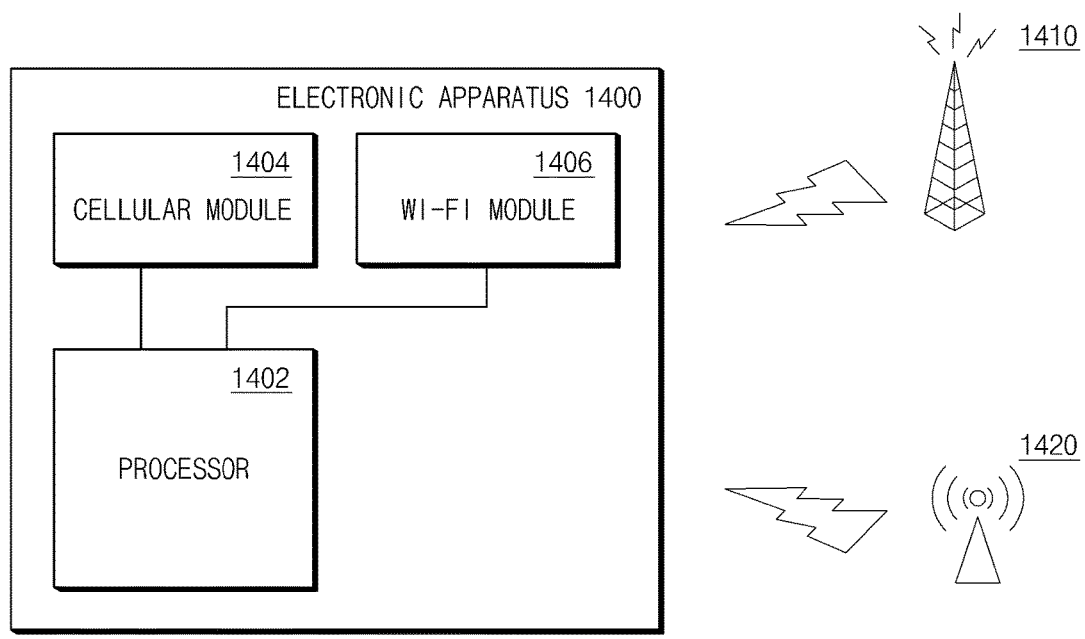
FIG. 14 is a block diagram illustrating a function configuration of a cellular module and a wireless fidelity (Wi-Fi) module according to an embodiment of the present disclosure.

FIG. 14 is a block diagram illustrating a function configuration of a cellular module and a Wi-Fi module according to an embodiment of the present disclosure.

Referring to FIG. 14, an electronic apparatus 1400 may include a processor 1402, a cellular module 1404, and a Wi-Fi module 1406. Hereinafter, other than the descriptions about the processor 1402 and the cellular module 1404, the duplicated portions may refer to the descriptions about the processor 502 and the cellular module 504 in FIG. 5.

The cellular module 1404 may perform cellular communication with a BS 1410 in an unlicensed band. The BS 1410 may be at least one of base stations supporting LTE, LTE-A, or LTE-U. The BS 1410 may be a BS performing LAA. The cellular module 1404 may be connected to a first network established by the BS 1410. The cellular module 1404 may be referred to as a "first network module". The cellular module 1404 may receive a signal from the Wi-Fi module 1406.

The Wi-Fi module 1406 may transmit or receive a signal to or from an AP 1420 in the unlicensed band. The Wi-Fi module 1406 may receive the reference signal or the preamble from the AP 1420. The Wi-Fi module 1406 may include a Wi-Fi preamble detection filter that detects the preamble from the AP 1420. The Wi-Fi module 1406 may transmit a signal to the cellular module 1404 through an inter-module interface. The Wi-Fi module 1406 may transmit or receive an RF signal through a separate RF module. The Wi-Fi module 1406 may communicate with the second network. The Wi-Fi module 1406 may be referred to as a "second network module".

According to an embodiment of the present disclosure, the Wi-Fi module 1406 may perform at least part of functions that the processor 1402 provides. According to an embodiment, the Wi-Fi module 1406 may include a CP. Alternatively, the processor 1402 may provide a part of functions of the Wi-Fi module 1406.

The AP 1420 may establish the first network and the second network being a heterogeneous network. The second network may be a WLAN (e.g., Wi-Fi).

Figure 15:
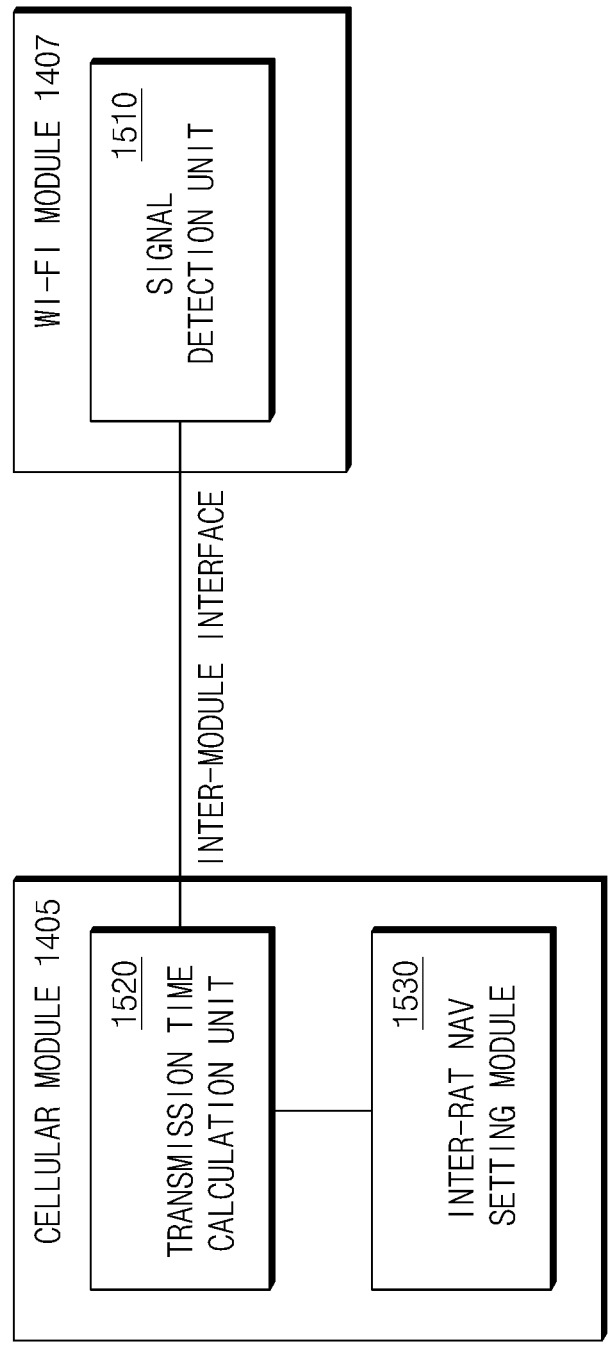
FIG. 15 is a block diagram illustrating a configuration of an electronic apparatus according to an embodiment of the present disclosure.

FIG. 15 is a block diagram illustrating an example of a function configuration of a cellular module and a Wi-Fi module according to an embodiment of the present disclosure.

Referring to FIG. 15, a Wi-Fi module 1407 may include a signal detection unit 1510. A cellular module 1405 may include a transmission time calculation unit 1520 and/or an inter-RAT NAV setting module 1530.

The signal detection unit 1510 of the Wi-Fi module 1407 may detect a signal of a second network. The signal of the second network may be a reference signal or a preamble. In an embodiment, the second network may be a WLAN (e.g., Wi-Fi). In an embodiment, the preamble may be a Wi-Fi preamble. The signal detection unit 1510 may include a Wi-Fi preamble detection filter.

In the case where the reference signal or the preamble of the second network is detected by the signal detection unit 1510, the Wi-Fi module 1407 may inform the cellular module 1405 that the reference signal or the preamble is detected. The Wi-Fi module 1407 may transmit detection information to the cellular module 1405 through an inter-module interface.

The transmission time calculation unit 1520 may receive the detection information through the inter-module interface. The transmission time calculation unit 1520 may calculate a channel occupation time of the second network. The transmission time calculation unit 1520 may calculate a transmission time when the second network performs transmission, based on the reference signal or the preamble.

The inter-RAT NAV setting module 1530 may set a channel state to a busy state based on the calculated transmission time. The inter-RAT NAV setting module 1530 may switch an operating mode from the first mode to the second mode based on the calculated transmission time. The inter-RAT NAV setting module 1530 may set NAV such that a mode is switched. In an embodiment, the first mode may be a wakeup mode. In an embodiment, the second mode may be a sleep mode.

A partial configuration of the cellular module 1405 may be implemented by the processor 1402.

Hereinafter, a method of calculating the transmission time of the second network will be described with reference to FIGS. 16 to 18.

Figure 16:
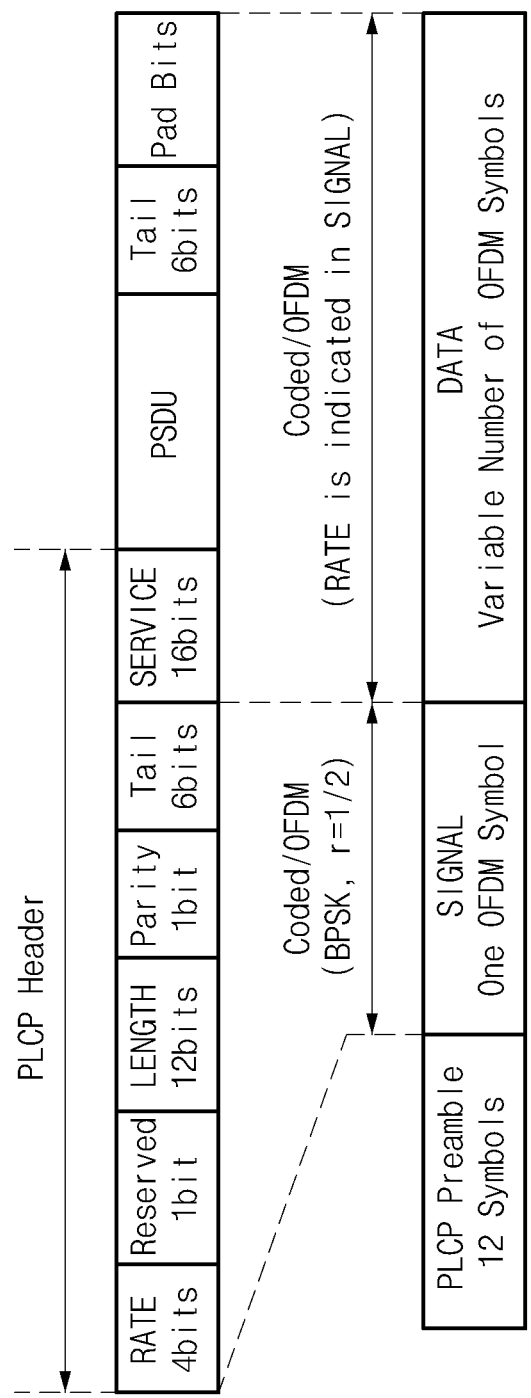
FIG. 16 illustrates a frame structure in a wireless local area network (WLAN) system according to an embodiment of the present disclosure.

FIG. 16 illustrates a frame structure in a WLAN system of IEEE 802.11 applied according to an embodiment of the present disclosure.

Referring to FIG. 16, the frame of the WLAN system may include an OFDM physical layer convergence procedure (PLCP) preamble, a signal field, and a data field. The frame of the WLAN system may be referred to as a "PLCP protocol data unit (PPDU) frame".

The PLCP preamble may be used such that a module (e.g., the cellular module 1405 or the Wi-Fi module 1407) receiving a signal detects the start of the signal and performs time/frequency synchronization. The PLCP preamble may include 12 symbols.

The signal field may include a rate field of 4 bits indicating a data rate, a reserved field of 1 bit, a length field of 12 bits, a parity field of 1 bit, and a tail field of 6 bits in a PLCP header. The signal field may include one symbol. In an embodiment, one symbol may be an OFDM symbol.

The data field may include a service field of 16 bits in the PLCP header, a PLCP service data unit (PSDU), and a tail field. The data field may further include pad bits for meeting the octet of the PPDU frame.

Figure 17:
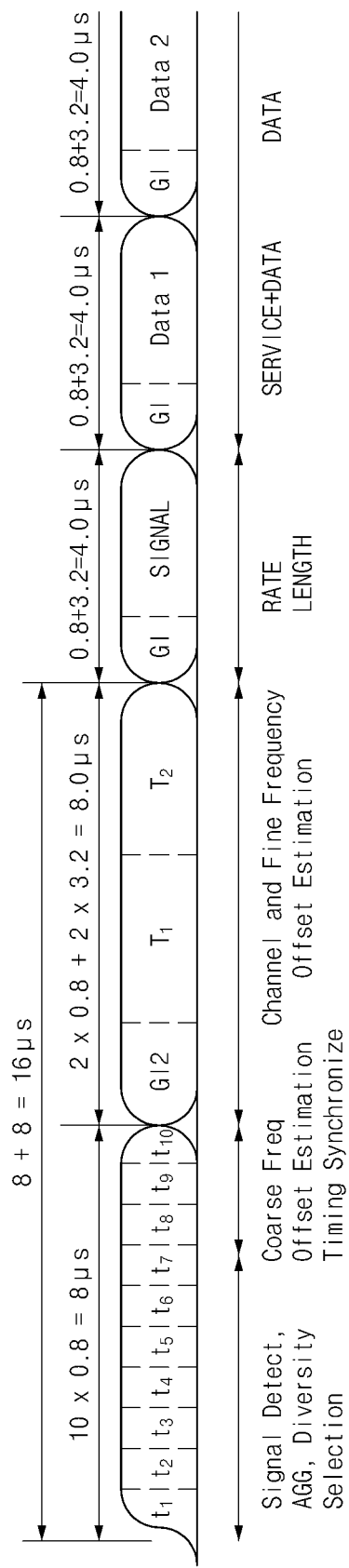
FIG. 17 illustrates a structure of a preamble and a signal in a WLAN system according to an embodiment of the present disclosure.

FIG. 17 illustrates a structure of a PLCP preamble and a signal according to an embodiment of the present disclosure.

Referring to FIG. 17, a preamble may be implemented with a length of 16 µs. The preamble may include a short training field (STF) sequence of the first half of 8 µs and a long training field (LTF) sequence of the second half of 8 pts. The STF sequence may be used for signal detection and coarse synchronization, and the LTF sequence may be used for fine time/frequency synchronization.

A signal field may be implemented with a length of 4 µs. The signal field may include a data rate and length information. A module (e.g., the cellular module 1405 or the Wi-Fi module 1407) receiving a signal may detect the signal by using the preamble and may perform time/frequency synchronization. The module receiving the signal may receive a signal field to grasp the transmission speed and the length information that are used to transmit data. In an embodiment, the module receiving a signal may grasp the transmission speed and the length information that are used for PSDU.

Figure 18:
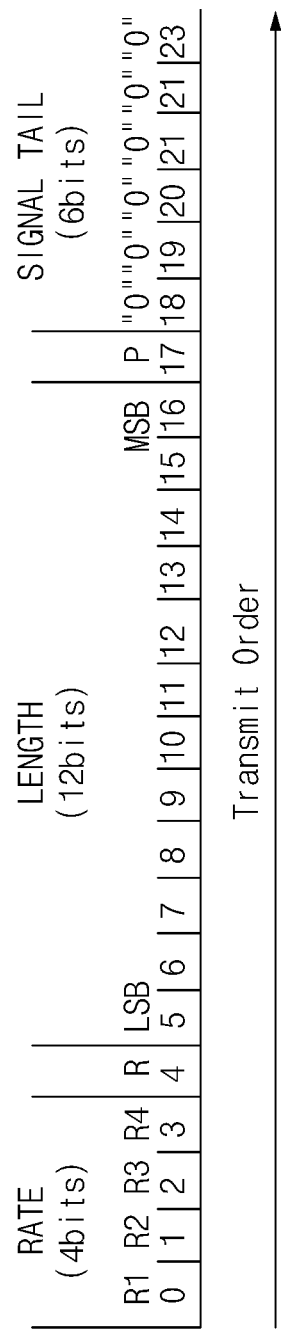
FIG. 18 illustrates a structure of a signal field in a WLAN system according to an embodiment of the present disclosure.

FIG. 18 illustrates a structure of a signal field in a WLAN system according to an embodiment of the present disclosure.

Referring to FIG. 18, a rate field may include 4 bits of R1 to R4, and information of 4 bits may indicate a data rate used to transmit PSDU. The data rate is related to the transmission speed of data. A length field may be represented as 12 bits and may indicate the length of PSDU.

Table 1 illustrates the data rate expressed by 4 bits of the rate field in a bandwidth of 20 MHz.

TABLE 1

| R1-R4 | Rate(Mb/s) (20 MHz channel spacing) | Rate(Mb/s) (10 MHz channel spacing) | Rate(Mb/s) (5 MHz channel spacing) |
|---|---|---|---|
| 1101 | 6 | 3 | 1.5 |
| 1111 | 9 | 4.5 | 2.25 |
| 0101 | 12 | 6 | 3 |
| 0111 | 18 | 9 | 4.5 |
| 1001 | 24 | 12 | 6 |
| 1011 | 36 | 18 | 9 |
| 0001 | 48 | 24 | 12 |
| 0011 | 54 | 27 | 13.5 |

The transmission time 'txtime' of a WLAN frame may be calculated by using the data rate and the length information of the signal field as described below in Equation 1.

$$txtime = T_{preamble} + T_{signal} + T_{SYM} \times N_{SYM} \quad \text{Equation 1}$$

Each of variables may use a value defined in the IEEE 802.11 standard. $T_{preamble}$ is the length value of a preamble. $T_{preamble}$ may be 16 µs. $T_{signal}$ may be the length value of a signal field and may be 4 µs. $T_{SYM}$ may denote the length of an OFDM symbol. $T_{SYM}$ may be 4 µs. $N_{SYM}$ denotes the number of symbols used for data transmission. Accordingly, the multiplication of $T_{SYM}$ and $N_{SYM}$ may denote the transmission time of the data.

$N_{SYM}$ may be defined by Equation 2 below.

$$N_{SYM} = \text{ceiling}((16 + 8 \times \text{LENGTH} + 6)/N_{DBPS}) \quad \text{Equation 2}$$

Ceiling is a ceiling function. Ceiling (x) defines the smallest integer greater than or equal to 'x'. $N_{DBPS}$ denotes the number of data bits per OFDM symbol. "16+8×LENGTH+6" may denote the total number of bits used for a service field, PSDU, and a tail field. "16" corresponds to the number of bits of a service field in a data field. "8×LENGTH" corresponds to the number of bits of PSDU. "6" corresponds to the number of bits of a tail field in the data field. A value obtained by dividing the total number of bits by the number of data bits $N_{DBPS}$ corresponds to the total number of OFDM symbols $N_{SYM}$.

$N_{DBPS}$ may be determined depending on a data rate used for data transmission. Table 2 below denotes $N_{DBPS}$ according to a rate.

TABLE 2

| Modulation | Coding Rate(R) | Coded bits per subcarrier ($N_{BPSC}$) | Coded bits per OFDM symbol($N_{CBPS}$) | Data bits per OFDM symbol($N_{DBPS}$) | Data rate(Mb/s)(20 MHz channel spacing) | Data rate(Mb/s)(10 MHz channel spacing) | Data rate(Mb/s)(5 MHz channel spacing) |
|---|---|---|---|---|---|---|---|
| BPSK | 1/2 | 1 | 48 | 24 | 6 | 3 | 1.5 |
| BPSK | 3/4 | 1 | 48 | 36 | 9 | 4.5 | 2.25 |
| QPSK | 1/2 | 2 | 96 | 48 | 12 | 6 | 3 |
| QPSK | 3/4 | 2 | 96 | 72 | 18 | 9 | 4.5 |
| 16-QAM | 1/2 | 4 | 192 | 96 | 24 | 12 | 6 |
| 16-QAM | 3/4 | 4 | 192 | 144 | 36 | 18 | 9 |
| 64-QAM | 1/2 | 6 | 288 | 192 | 48 | 24 | 12 |
| 64-QAM | 3/4 | 6 | 288 | 216 | 54 | 27 | 13.5 |

Referring to Table 2, for example, in the case where a rate is 18 Mbps in a bandwidth of 20 MHz, NDBPS has 72 bits. In the case where the rate is 6 Mbps, NDBPS is 24 bits.

In the case where the length is 1500 bytes and the rate is 6 Mbps in a bandwidth of 20 MHz, NSYM may be "501" depending on Equation 2. In this case, transmission time "Txtime" may be 2024 µs.

Meanwhile, an electronic apparatus (e.g., the electronic apparatus 1200 or the electronic apparatus 1400) may detect the signal received through the WLAN frame, based on the transmission waveform of a WLAN frame. The electronic apparatus 1200 or the electronic apparatus 1400 may detect the transmission waveform of the WLAN frame by using a filter.

Figure 19:
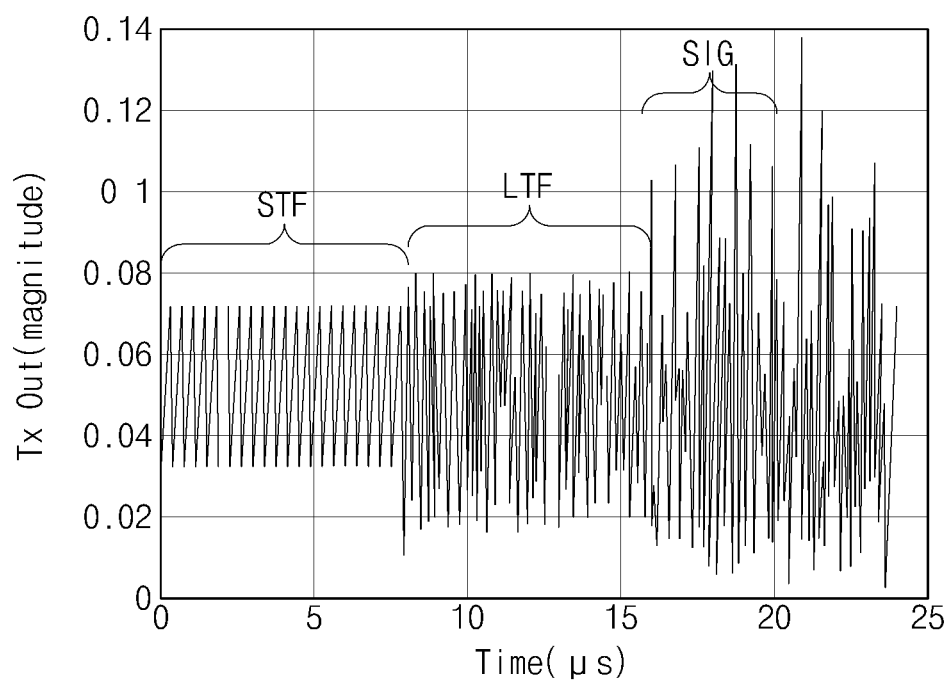
FIG. 19 illustrates a transmission waveform of a WLAN frame according to an embodiment of the present disclosure.

FIG. 19 illustrates a transmission waveform of a WLAN frame according to an embodiment of the present disclosure.

Referring to FIG. 19, a signal transmitted in a time domain has a waveform. The beginning of the transmission waveform of 8 µs represents the transmission waveform of the STF sequence. The middle of the transmission waveform of 8 µs represents the transmission waveform of the LTF sequence. Afterwards, the signal field may be transmitted for 4 µs, and finally data may be transmitted.

Hereinafter, an embodiment of the present disclosure will be described based on the electronic apparatus 1200. The following embodiments may be performed in the electronic apparatus 1400.

Figure 20:
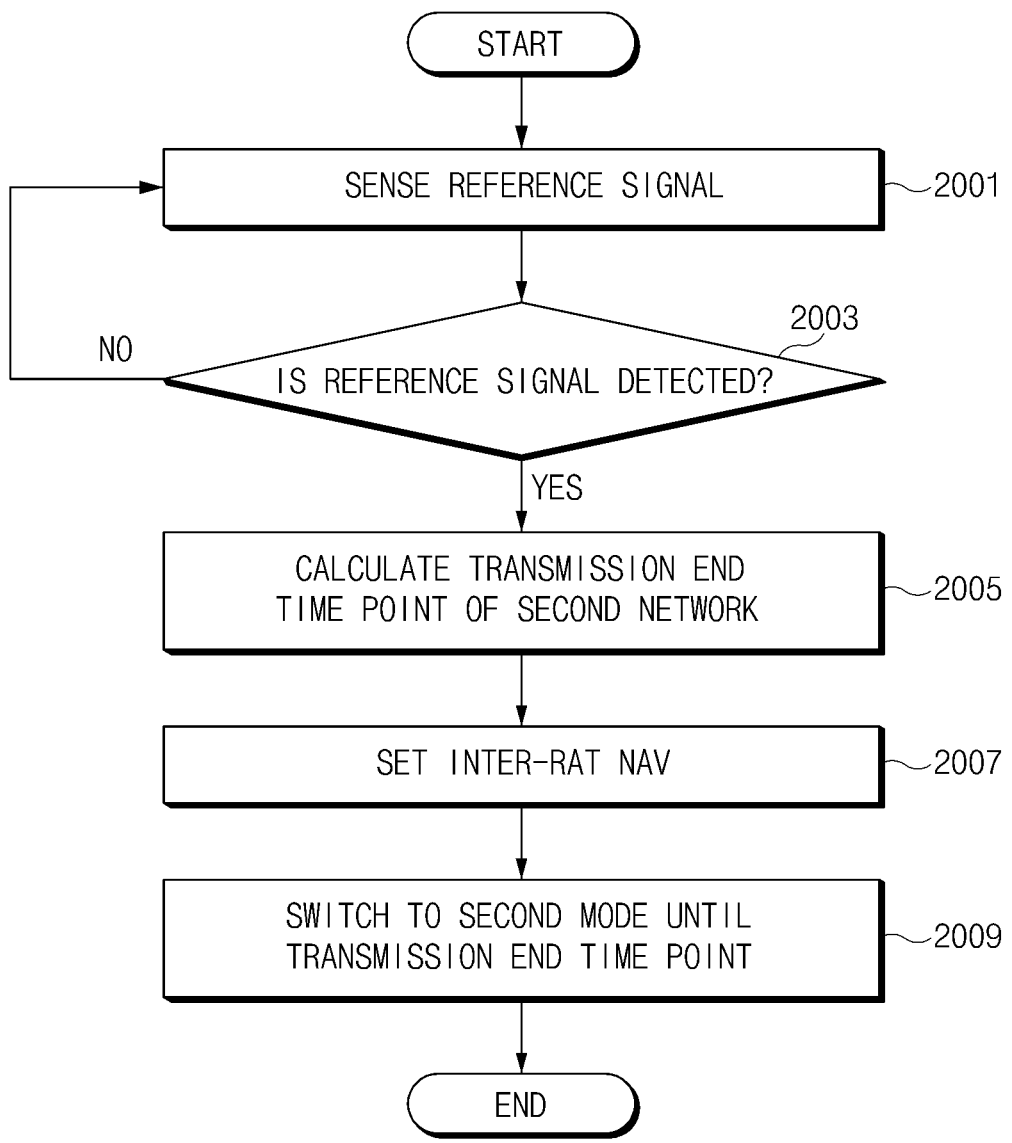
FIG. 20 is a flowchart illustrating an example of a reception operation of an electronic apparatus in an unlicensed band according to an embodiment of the present disclosure.

FIG. 20 is a flowchart illustrating an example of a reception operation of an electronic apparatus in an unlicensed band according to an embodiment of the present disclosure. The operation of the electronic apparatus 1200 according to a channel occupation state of a second network will be described with reference to FIG. 20.

In operation 2001, the electronic apparatus 1200 may sense whether a reference signal or a preamble is received from a BS of the second network. For example, the BS of the second network may be the AP 1420.

In operation 2003, the electronic apparatus 1200 may determine whether the reference signal or the preamble is detected. The electronic apparatus 1200 may determine whether the reference signal or the preamble is detected, by using the signal detection unit 1310 of the cellular module 1205. In the case where the reference signal or the preamble is not detected, the electronic apparatus 1200 may perform operation 2001.

In the case where the reference signal or the preamble is detected, in operation 2005, the electronic apparatus 1200 may calculate the transmission end time point of the second network. The transmission end time point may be referred to as "time tEND". Time tEND may be calculated by the transmission time calculation unit 1320 of the cellular module 1205. Time tEND may be calculated based on descriptions about various embodiments in FIGS. 16 to 18.

In operation 2007, the electronic apparatus 1200 may set the second network based on time tEND. The electronic apparatus 1200 may set inter-RAT NAV. The NAV may mean time information for providing notification that a channel is being used. An inter-RAT NAV may be time information for occupying the channel in the second network. NAV may perform a role of a timer.

In operation 2009, the electronic apparatus 1200 may switch an operating mode to a second mode. The electronic apparatus 1200 may maintain the operating mode in the second mode during a second duration. The second duration may include all or part of a duration from a NAV setting time point to time tEND. The second duration may include all or part of a duration from the NAV setting time point to an end time point of a PPDU frame. The second duration may include all or part of the data field of the PPDU frame. The second duration may end at time tEND.

Figure 21:
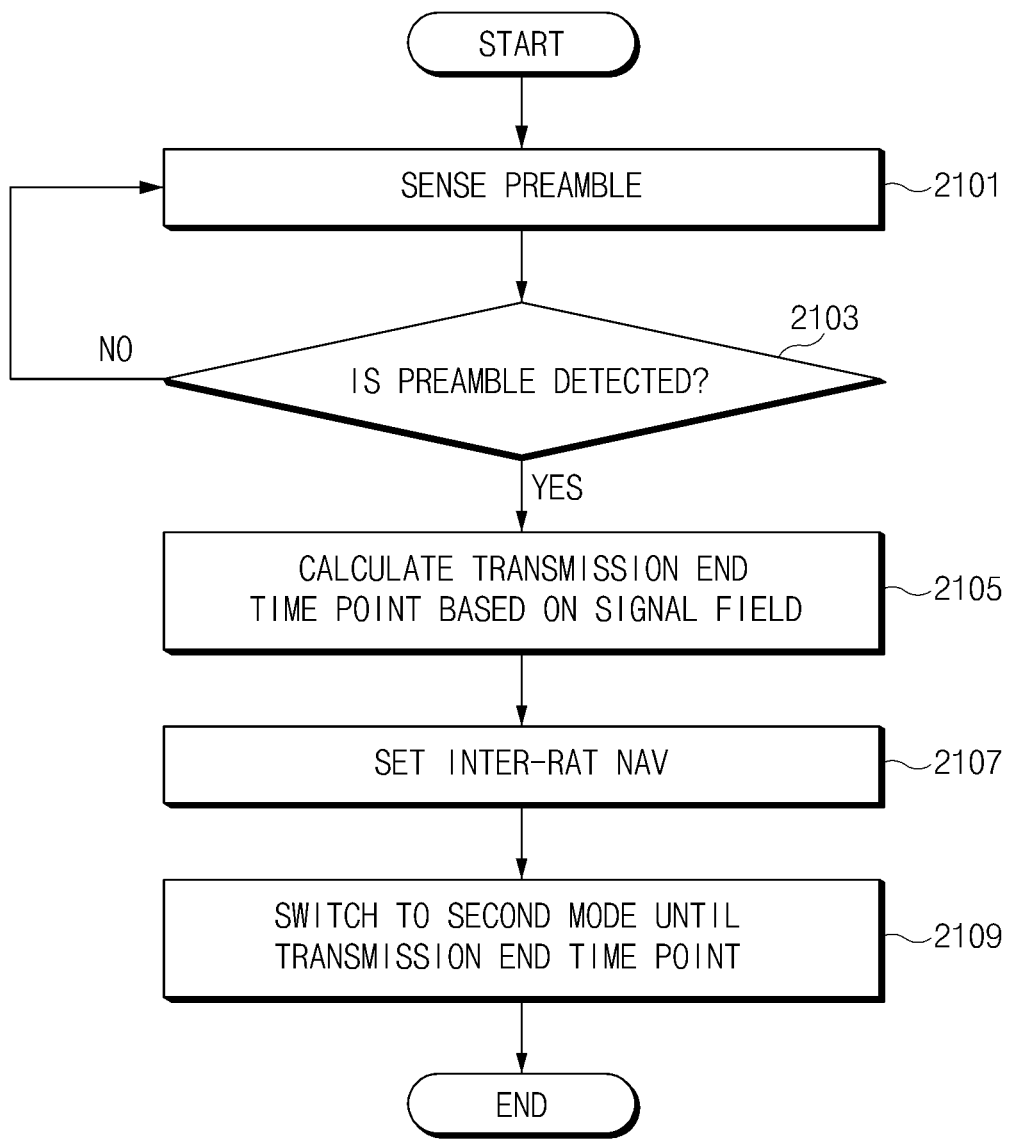
FIG. 21 is a flowchart illustrating another example of a reception operation of an electronic apparatus in an unlicensed band according to an embodiment of the present disclosure.

FIG. 21 is a flowchart illustrating another example of a reception operation of an electronic apparatus in an unlicensed band according to an embodiment of the present disclosure. The operation of the electronic apparatus 1200 in the case where a second network is a WLAN is described in FIG. 21.

In operation 2101, the electronic apparatus 1200 may sense whether a preamble is received from the AP 1220.

In operation 2103, the electronic apparatus 1200 may determine whether the preamble is detected. The electronic apparatus 1200 may determine whether the preamble is detected. The electronic apparatus 1200 may determine whether the preamble is detected, by using a reception filter. In the case where the preamble is not detected, the electronic apparatus 1200 may perform operation 2101. In the case of the electronic apparatus 1400, the signal detection unit 1510 of the Wi-Fi module 1407 may detect the preamble.

In the case where the preamble is detected, in operation 2105, the electronic apparatus 1200 may calculate the transmission end time point of the AP 1220 based on a signal field. The transmission end time point may be referred to as "time tEND". Time tEND may be calculated by the transmission time calculation unit 1320 of the cellular module 1205. Time tEND may be calculated based on descriptions about various embodiments in FIGS. 16 to 18. In the case of the electronic apparatus 1400, the signal detection unit 1510 of the Wi-Fi module 1407 may transmit detection information to the transmission time calculation unit 1520 of the cellular module 1405. The detection information may include at least one of information for providing notification that the preamble is detected, a data rate and length information obtained from a PDCP frame, a preamble, a signal field, or a data field.

In operation 2107, the electronic apparatus 1200 may set the second network based on time tEND. The electronic apparatus 1200 may set inter-RAT NAV associated with a WLAN.

In operation 2109, the electronic apparatus 1200 may switch an operating mode to a second mode. The electronic apparatus 1200 may maintain the cellular module 1205 in the second mode until time tEND. If setting the inter-RAT NAV while maintaining an operating mode as a first mode during a first duration, the electronic apparatus 1200 may set the operating mode to the second mode during a second duration. The second duration may be maintained until time tEND. The settings of the inter-RAT NAV may be maintained until time tEND.

Figure 22:
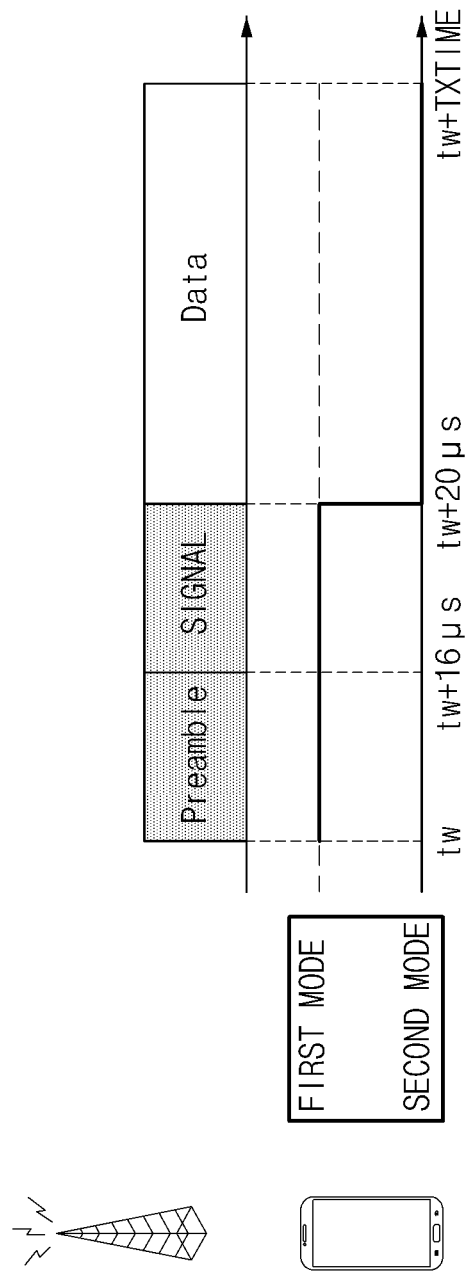
FIG. 22 illustrates an example of a state switching operation of a cellular module of an electronic apparatus according to an embodiment of the present disclosure.

FIG. 22 illustrates an example of a state switching operation of a cellular module of an electronic apparatus according to an embodiment of the present disclosure.

Referring to FIG. 22, the AP 1220 may start transmission at time tw. The AP 1220 may transmit a preamble during a duration from time tw− to time "tw+16 μs", and may transmit a signal field during a duration from time "tw+16 μs" to time "tw+20 μs". It is assumed that data is transmitted during a duration from time "tw+20 μs" to time "tw+txtime". In an embodiment, time "txtime" may be determined based on information received through a PPDU frame. In an embodiment, time "txtime" may be determined depending on descriptions about various embodiments in FIGS. 16 to 18.

The electronic apparatus 1200 may receive the preamble and the signal field through the PPDU frame. In this case, the operating mode may be a first mode. The electronic apparatus 1200 may calculate the transmission time of the AP 1220 based on the preamble and the signal field.

The electronic apparatus 1200 may calculate the transmission time and may switch the operating mode from the first mode to a second mode. The electronic apparatus 1200 may switch the mode of the cellular module 1204 to the second mode. The electronic apparatus 1200 may operate in the first mode during a first duration and may operate in the second mode during a second duration. The first duration may include a duration corresponding to the preamble and the signal field. The second duration may be determined based on the calculated transmission time. The second duration may include a duration corresponding to a data field. The length of the second duration may correspond to a difference between the calculated transmission time and the length of the preamble and the signal field. The electronic apparatus 1200 may maintain the second mode during a duration from time "tw+20 μs" to time "tw+txtime" of FIG. 22.

In the case where the length field denotes 1500 bytes and a rate field indicates 6 Mbps, time "txtime" may be 2024 μs. According to the conventional technology, an electronic apparatus may maintain the operating mode as the first mode during a duration from time "tw μs" to time "tw+2024 μs". On the other hand, the electronic apparatus 1200 according to an embodiment of the present disclosure remains in the first mode during a duration from time "tw μs" to time "tw+20 μs". That is, as compared with the conventional technology, a duration in which the operating mode is maintained as the first mode is 1% of the whole duration.

Accordingly, according to an embodiment of the present disclosure, unnecessary power consumption may be reduced by 99%.

Each of the above-mentioned elements of the electronic apparatus according to various embodiments of the present disclosure may be configured with one or more components, and the names of the elements may be changed according to the type of the electronic apparatus. In various embodiments, the electronic apparatus may include at least one of the above-mentioned elements, and some elements may be omitted or other additional elements may be added. Furthermore, some of the elements of the electronic apparatus according to various embodiments may be combined with each other so as to form one entity, so that the functions of the elements may be performed in the same manner as before the combination.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 502), may cause the one or more processors to perform a function corresponding to the instruction. The computer-readable storage media, for example, may be the memory.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory)). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a radio frequency (RF) module configured to receive a signal from a base station (BS) of a first network through a downlink subframe including a plurality of symbols in an unlicensed band; and
at least one processor configured to operate in a first mode or in a second mode, power consumed in the second mode being less than power consumed in the first mode,
wherein the at least one processor is further configured to:
measure received signal strength in the first mode during a first duration corresponding to a part of a specific symbol among the plurality of symbols; and
in response to the measured received signal strength satisfying a specified level, operate in the second mode during a second duration including the remaining part of the specific symbol.

2. The electronic apparatus of claim 1, wherein the second duration is configured to include the remaining symbols, after the specific symbol, from among the plurality of symbols.

3. The electronic apparatus of claim 1,
wherein the downlink subframe includes a plurality of slots, and one slot of the plurality of slots includes the specific symbol, and
wherein the second duration is configured to include the remaining symbols, after the specific symbol, from among the plurality of symbols included in the one slot.

4. The electronic apparatus of claim 1, wherein the first mode is a wakeup mode, and the second mode is a sleep mode.

5. The electronic apparatus of claim 1, wherein the BS is a BS supporting long term evolution (LTE) licensed assisted access (LAA) or LTE-unlicensed (LTE-U).

6. The electronic apparatus of claim 1, wherein the specific symbol is a first symbol of the plurality of symbols.

7. The electronic apparatus of claim 1,
wherein the downlink subframe includes a plurality of slots, and
wherein the specific symbol is a first symbol of symbols included in one slot of the plurality of slots.

8. The electronic apparatus of claim 1, wherein the at least one processor is further configured to define the specified level as a case where the measured strength of the reception signal is less than a threshold value during a preset time.

9. The electronic apparatus of claim 1, wherein the at least one processor is further configured to express the measured received signal strength by using a received signal strength indicator (RSSI).

10. The electronic apparatus of claim 1, wherein the at least one processor is further configured to operate in the first mode after the second duration.

11. The electronic apparatus of claim 7, wherein the downlink subframe is a partial start subframe.

12. A method in which an electronic apparatus receives a signal in an unlicensed band in a wireless communication system, the method comprising:
measuring, by the electronic apparatus in a wakeup mode, received signal strength in a first duration corresponding to a part of a specific symbol; and
in response to the measured received signal strength satisfying a specified level, switching to a sleep mode during a second duration including the remaining part of the specific symbol.

13. The method of claim 12, wherein the specific symbol is a first symbol of a plurality of symbols included in a downlink subframe.

14. The method of claim 12, wherein the specific symbol is a first symbol of a plurality of symbols included in one slot of a plurality of slots included in a downlink subframe.

15. The method of claim 12, further comprising switching to the first mode after the second duration.

* * * * *